United States Patent
Bang et al.

(10) Patent No.: US 10,194,133 B2
(45) Date of Patent: Jan. 29, 2019

(54) DEVICE AND METHOD FOR ELIMINATING REDUNDANCY OF VIEW SYNTHESIS PREDICTION CANDIDATE IN MOTION MERGE MODE

(71) Applicants: Electronics & Telecommunications Research Institute, Daejeon (KR); UNIVERSITY-INDUSTRY COOPERATION GROUP OF KYUNG HEE UNIVERSITY, Yongin-si (KR)

(72) Inventors: Gun Bang, Daejeon (KR); Gwang Soon Lee, Daejeon (KR); Gwang Hoon Park, Seongnam-si (KR); Min Seong Lee, Pyeongtaek-si (KR); Nam Ho Hur, Sejong (KR); Young Su Heo, Suwon-si (KR)

(73) Assignees: Electronics and Telecommunications Research Institute, Daejeon (KR); University-Industry Cooperation Group Of Kyung Hee University, Yongin-si (KR)

( * ) Notice: Subject to any disclaimer, the term of this patent is extended or adjusted under 35 U.S.C. 154(b) by 118 days.

(21) Appl. No.: 15/317,782

(22) PCT Filed: May 29, 2015

(86) PCT No.: PCT/KR2015/005412
§ 371 (c)(1),
(2) Date: Dec. 9, 2016

(87) PCT Pub. No.: WO2016/003074
PCT Pub. Date: Jan. 7, 2016

(65) Prior Publication Data
US 2017/0127041 A1 May 4, 2017

(30) Foreign Application Priority Data

Jun. 30, 2014 (KR) .................... 10-2014-0081191
May 28, 2015 (KR) .................... 10-2015-0074951

(51) Int. Cl.
*H04N 19/44* (2014.01)
*H04N 13/161* (2018.01)
(Continued)

(52) U.S. Cl.
CPC ......... *H04N 13/161* (2018.05); *H04N 19/176* (2014.11); *H04N 19/44* (2014.11);
(Continued)

(58) Field of Classification Search
CPC ............ H04N 13/161; H04N 13/0048; H04N 19/597; H04N 19/176; H04N 19/44
(Continued)

(56) References Cited

U.S. PATENT DOCUMENTS

2008/0198924 A1* 8/2008 Ho ................. H04N 19/597
375/240.01
2013/0051469 A1* 2/2013 Park .................. H04N 19/159
375/240.14
(Continued)

FOREIGN PATENT DOCUMENTS

KR 10-2013-0044189 A 5/2013
WO WO 2013/067938 A1 5/2013
(Continued)

OTHER PUBLICATIONS

He et al, Generalized view synthesis prediction for 3D-AVC (Year: 2013).*
(Continued)

*Primary Examiner* — Shan E Elahi
(74) *Attorney, Agent, or Firm* — NSIP Law

(57) ABSTRACT

The present invention provides a three-dimensional image decoding method comprising the steps of: inserting a first candidate block into a merge candidate list; when view synthesis prediction (VSP) has been used in the first candidate block, generating information indicating that the VSP has been used; and when information indicating that the VSP has been used exists, refraining from inserting the VSP candidate of the current block into the merge candidate list.

20 Claims, 31 Drawing Sheets

(51) Int. Cl.
H04N 19/597 (2014.01)
H04N 19/176 (2014.01)
H04N 19/52 (2014.01)
H04N 13/111 (2018.01)

(52) U.S. Cl.
CPC .......... *H04N 19/52* (2014.11); *H04N 19/597* (2014.11); *H04N 13/111* (2018.05)

(58) Field of Classification Search
USPC .................................................. 375/240.16
See application file for complete search history.

(56) References Cited

U.S. PATENT DOCUMENTS

| | | | | |
|---|---|---|---|---|
| 2014/0269898 A1* | 9/2014 | Thirumalai | .......... | H04N 13/161 375/240.02 |
| 2014/0307795 A1* | 10/2014 | Chen | .................... | H04N 19/597 375/240.16 |
| 2014/0376633 A1* | 12/2014 | Zhang | .................. | H04N 19/105 375/240.16 |
| 2015/0003521 A1* | 1/2015 | Thirumalai | .......... | H04N 19/597 375/240.08 |
| 2015/0003529 A1* | 1/2015 | Thirumalai | .......... | H04N 19/597 375/240.14 |
| 2015/0023423 A1* | 1/2015 | Zhang | .................. | H04N 19/176 375/240.16 |
| 2015/0030073 A1* | 1/2015 | Chen | .................... | H04N 19/597 375/240.16 |
| 2015/0030087 A1* | 1/2015 | Chen | .................... | H04N 19/597 375/240.27 |
| 2015/0085930 A1* | 3/2015 | Zhang | .................. | H04N 19/136 375/240.15 |
| 2015/0117517 A1* | 4/2015 | Heo | ...................... | H04N 19/597 375/240.02 |
| 2015/0189323 A1* | 7/2015 | An | ........................ | H04N 19/597 375/240.16 |
| 2015/0195572 A1* | 7/2015 | Chen | .................... | H04N 19/517 375/240.16 |
| 2015/0281729 A1* | 10/2015 | Lin | ...................... | H04N 19/174 375/240.16 |
| 2016/0227251 A1* | 8/2016 | Lee | ...................... | H04N 19/597 |

FOREIGN PATENT DOCUMENTS

| | | |
|---|---|---|
| WO | WO 2013/106336 A2 | 7/2013 |
| WO | WO 2014/053086 A1 | 4/2014 |
| WO | WO 2014/053099 A1 | 4/2014 |
| WO | WO 2014/058280 A1 | 4/2014 |

OTHER PUBLICATIONS

Yichen Zhang, et al., "Simplification for VSP-related Merge Candidate List Construction," *Proceedings from the 9th Meeting of Joint Collaborative Team on 3D Video Coding Extensions of ITU-T SG 16 WP 3 and ISO/IEC JTC 1/SC 29/WG 11*, Sapporo, Japan, Jul. 3-9, 2014, pp. 1-3 (4 pages in English).

International Search Report dated Aug. 21, 2015, in counterpart International Application No. PCT/KR2015/005412 (2 pages in English, 2 pages in Korean).

Zou, Feng, et al. "CE1.h: Results on View Synthesis Prediction" *Joint Collaborative Team on 3D Video Coding Extension Development of ITU-T SG 16 WP 3 and ISO/IEC JTC 1/SC 29/WG 11*, 2nd meeting Shanghai, China, Oct. 13-19, 2012 (12 pages in English).

Tech, Gerhard, et al. "3D-HEVC Test Model 4", *Joint Collaborative Team on 3D Video Coding Extension Development of ITU-T SG 16 WP 3 and ISO/IEC JTC 1/SC 29/WG 11*, 4th meeting, Incheon, Republic of Korea, Apr. 20-26, 2013 (53 pages in English).

Extended European Search Report dated Feb. 20, 2018 in corresponding European Patent Application No. 15814370.1 (10 pages in English).

* cited by examiner (a) true image  (b) depth information map

FIG. 17

| ... | A1 (VSP) | IvDC | VSP | B0 (VSP) | ... |

DEVICE AND METHOD FOR ELIMINATING REDUNDANCY OF VIEW SYNTHESIS PREDICTION CANDIDATE IN MOTION MERGE MODE

CROSS-REFERENCE TO RELATED APPLICATIONS

This application is a National Phase of PCT Application No. PCT/KR2015/005412 filed on May 29, 2015, which claims the benefit under 35 USC 119(a) of Korean Patent Application No. 10-2014-0081191 filed Jun. 30, 2014, and Korean Patent Application No. 10-2015-0074951 filed May 28, 2015 in the Korean Intellectual Property Office, the entire disclosure of which is incorporated herein by reference for all purposes.

BACKGROUND OF THE INVENTION

Field of the Invention

The present invention relates to image encoding/decoding apparatuses and methods, and more specifically, to encoding/decoding apparatuses and methods for eliminating redundancy of view synthesis prediction candidates in a merge mode.

Related Art

As the growing information technology (IT) industry is spreading worldwide high definition (HD) broadcast services, more and more people happen to be used to HD videos and are demanding higher-quality and higher-resolution videos. To live up to such users, a number of related organizations are spurred to develop next-generation imaging devices. Users who are used to HD video quality demand images of higher quality and higher resolution, and to respond to such demand, many organizations are spurring themselves on to develop next-generation imaging devices. Accordingly, images supportive FHD (Full HD) and UHD (Ultra High Definition) are nowadays commonplace, and thus, users can see higher-resolution images.

Users' demand goes further step to 3D effect videos alongside high quality and high definition. Thus, the organizations have developed 3D images to satisfy such demand.

A 3D image requires depth map information as well as true image (texture) information. A 3D image requires much more information as compared with a 2D image. When a 3D image is coded/decoded using an image encoding/decoding apparatus and method for 2D images, insufficient encoding/decoding efficiency may be obtained.

SUMMARY OF THE INVENTION

An object of the present invention is to provide an image encoding/decoding apparatus and method for eliminating redundancy of a merge candidate inserted into a merge list.

Another object of the present invention is to provide an apparatus and method for eliminating redundancy of a merge candidate in 3D image encoding/decoding.

Still another object of the present invention is to provide an apparatus and method for eliminating redundancy of a view synthesis prediction candidate in 3D image encoding/decoding.

According to an embodiment of the present invention, there is provided a 3D image decoding method comprising inserting a candidate into a first candidate block of a merge candidate list, generating information indicating that the inherited view synthesis prediction (VSP) candidate has been used when the inherited VSP candidate from a neighboring block of current block has been used in the first candidate block, and abstaining from inserting a VSP candidate of a current block into the merge candidate list when there is the information indicating that the inherited VSP candidate has been used.

Here, the first candidate block may be a spatial neighboring block.

Here, the first candidate block may be the spatial neighboring block positioned at a left side of the current block.

Here, the first candidate block may be an A1 block.

Here, the information indicating that the VSP has been used may include information indicating whether the first candidate block is available or information indicating whether the VSP has been used in the first candidate block.

Here, the 3D image decoding method may further comprise inserting one candidate into the first candidate block of the merge candidate list and then inserting other candidate into a second candidate block of the merge candidate list, wherein a information indicating that the inherited VSP candidate has been used, when the inherited VSP candidate has been used in the first candidate block or the second candidate block, the information may be generated.

Here, the first candidate block may be s spatial neighboring block positioned at a left side of the current block, and the second candidate block may be a spatial neighboring block positioned at an upper side of the current block.

Here, the first candidate block may be an A1 block, and the second candidate block may be a B1 block.

Here, the current block may be a sub prediction block.

According to another embodiment of the present invention, there is provided a 3D image decoding apparatus comprising a spatial merge candidate inserting module which allow to insert into a first candidate block of a merge candidate list, a VSP candidate redundancy check module which generate a information for indicating that the inherited VSP candidate from a neighboring block of a current block has been used at the first candidate block, and VSP candidate insertion module which decide to disable VSP candidate of a current block with there is the generated information from VSP redundancy check module.

Here, the first candidate block may be a spatial neighboring block.

Here, the first candidate block may be the spatial neighboring block positioned at a left side of the current block.

Here, the first candidate block may be an A1 block.

Here, the information indicating that the VSP has been used may include information indicating whether the first candidate block is available or information indicating whether the VSP has been used in the first candidate block.

Here, the spatial merge candidate inserting module may insert one candidate into the first candidate block of the merge candidate list and then inserts other candidate into a second candidate block of the merge candidate list, and the VSP candidate redundancy check module may generate the information indicating the inherited VSP candidate at the first candidate block or the second candidate block.

Here, the first candidate block may be s spatial neighboring block positioned at a left side of the current block, and the second candidate block may be a spatial neighboring block positioned at an upper side of the current block.

Here, the first candidate block may be an A1 block, and the second candidate block may be a B1 block.

Here, the current block may be a sub prediction block.

According to the present invention, there is provided a 3D image encoding method comprising inserting a candidate into a first candidate block of a merge candidate list, generating information indicating that the inherited view synthesis prediction (VSP) candidate has been used when VSP has been inherited from a neighboring block of a current block, and disabling a VSP candidate of a current block into the merge candidate list when there is the information indicating that the inherited VSP candidate has been used.

Here, the first candidate block may be a spatial neighboring block.

Here, the first candidate block may be the spatial neighboring block positioned at a left side of the current block.

Here, the first candidate block may be an A1 block.

Here, the information indicating that the VSP has been used may include information indicating whether the first candidate block is available or information indicating whether the VSP has been used in the first candidate block.

Here, the method may further comprise inserting one candidate into the first candidate block of the merge candidate list and then inserting other candidate into a second candidate block of the merge candidate list, wherein a information indicating that the inherited VSP candidate has been used, when the inherited VSP candidate has been used in the first candidate block or the second candidate block, the information may be generated.

Here, the first candidate block may be a spatial neighboring block positioned at a left side of the current block, and the second candidate block may be a spatial neighboring block positioned at an upper side of the current block.

Here, the first candidate block may be an A1 block, and the second candidate block may be a B1 block.

Here, the current block may be a sub prediction block.

According to the present invention, there is provided a 3D image encoding apparatus comprising a spatial merge candidate inserting module inserting a candidate into a first candidate block of a merge candidate list, a VSP redundancy determining module generating information indicating that the inherited VSP candidate from a neighboring block of a current block has been used in the first candidate block, and a VSP candidate inserting module abstaining from inserting a VSP candidate of a current block into the merge candidate list when there is the information indicating that the inherited VSP candidate has been used.

Here, the first candidate block may be a spatial neighboring block.

Here, the first candidate block may be the spatial neighboring block positioned at a left side of the current block.

Here, the first candidate block may be an A1 block.

Here, the information indicating that the VSP has been used may include information indicating whether the first candidate block is available or information indicating whether the VSP has been used in the first candidate block.

Here, the spatial merge candidate inserting module may insert one candidate into the first candidate block of the merge candidate list and then inserts other candidate into a second candidate block of the merge candidate list, and the VSP candidate redundancy check module may generate the information indicating the inherited VSP candidate at the first candidate block or the second candidate block.

Here, the first candidate block may be s spatial neighboring block positioned at a left side of the current block, and the second candidate block may be a spatial neighboring block positioned at an upper side of the current block.

Here, the first candidate block may be an A1 block, and the second candidate block may be a B1 block.

Here, the current block may be a sub prediction block.

According to the present invention, there is provided non-transitory a computer-readable recording medium retaining a computer-executable program for executing a 3D image decoding method comprising inserting a candidate into a first candidate block of a merge candidate list, when the inherited view synthesis prediction (VSP) candidate from a neighboring block of current block has been used in the first candidate block, generating information indicating that the inherited VSP candidate has been used, and when there is the information indicating that the inherited VSP candidate has been used, abstaining from inserting a VSP candidate of a current block into the merge candidate list.

Here, the first candidate block may be a spatial neighboring block.

Here, the first candidate block may be the spatial neighboring block positioned at a left side of the current block.

Here, the first candidate block may be an A1 block.

Here, the information indicating that the VSP has been used may include information indicating whether the first candidate block is available or information indicating whether the VSP has been used in the first candidate block.

Here, the method may further comprise inserting one candidate into the first candidate block of the merge candidate list and then inserting other candidate into a second candidate block of the merge candidate list, wherein a information indicating that the inherited VSP candidate has been used, when the inherited VSP candidate has been used in the first candidate block or the second candidate block, the information may be generated.

Here, the first candidate block may be s spatial neighboring block positioned at a left side of the current block, and the second candidate block may be a spatial neighboring block positioned at an upper side of the current block.

Here, the first candidate block may be an A1 block, and the second candidate block may be a B1 block.

Here, the current block may be a sub prediction block.

According to the present invention, there is provided a non-transitory computer-readable recording medium retaining a computer-executable program for executing that a 3D image encoding method comprising inserting a candidate into a first candidate block of a merge candidate list, when view synthesis prediction (VSP) has been inherited from a neighboring block of a current block, generating information indicating that the inherited VSP candidate has been used, and when there is the information indicating that the inherited VSP candidate has been used, disabling a VSP candidate of a current block into the merge candidate list.

Here, the first candidate block may be a spatial neighboring block.

Here, the first candidate block may be the spatial neighboring block positioned at a left side of the current block.

Here, the first candidate block may be an A1 block.

Here, the information indicating that the VSP has been used may include information indicating whether the first candidate block is available or information indicating whether the VSP has been used in the first candidate block.

Here, the method may further comprise inserting one candidate into the first candidate block of the merge candidate list and then inserting other candidate into a second candidate block of the merge candidate list, wherein a information indicating that the inherited VSP candidate has been used, when the inherited VSP candidate has been used in the first candidate block or the second candidate block, the information may be generated.

Here, the first candidate block may be s spatial neighboring block positioned at a left side of the current block, and the second candidate block may be a spatial neighboring block positioned at an upper side of the current block.

Here, the first candidate block may be an A1 block, and the second candidate block may be a B1 block.

Here, the current block may be a sub prediction block.

According to the present invention, redundancy of a merge candidate inserted in a merge list may be eliminated in image coding/decoding.

According to the present invention, redundancy of a merge candidate may be eliminated in 3D image coding/decoding.

According to the present invention, reception of a view synthesis prediction candidate may be eliminated in 3D image coding/decoding.

BRIEF DESCRIPTION OF THE DRAWINGS

FIG. 17 illustrates an example of a merge candidate list in 3D image encoding/decoding.

DESCRIPTION OF EXEMPLARY EMBODIMENTS

Hereinafter, embodiments of the present invention are described in detail with reference to the drawings. When determined to make the subject matter of the present invention unclear, the detailed description of known configurations or functions is omitted.

When an element is "connected to" or "coupled to" another element, the element may be directly connected or coupled to the other element or other elements may intervene. When a certain element is "included," other elements than the element are not excluded, and rather additional element(s) may be included in an embodiment or technical scope of the present invention.

The terms "first" and "second" may be used to describe various elements. The elements, however, are not limited to the above terms. In other words, the terms are used only for distinguishing an element from others. Accordingly, a "first element" may be named a "second element," and vice versa.

Further, the elements as used herein are shown independently from each other to represent that the elements have respective different functions. However, this does not immediately mean that each element cannot be implemented as a piece of hardware or software. In other words, each element is shown and described separately from the others for ease of description. A plurality of elements may be combined and operate as a single element, or one element may be separated into a plurality of sub-elements that perform their respective operations. Such also belongs to the scope of the present invention without departing from the gist of the present invention.

Further, some elements may be optional elements for better performance rather than necessary elements to perform essential functions of the present invention. The present invention may be configured only of essential elements except for the optional elements, and such also belongs to the scope of the present invention.

A 3D video provides the user with 3D real-life effects through a 3D stereoscopic display apparatus. In related studies, JCT-3V (The Joint Collaborative Team on 3D Video Coding Extension Development) of ISO/IEC's MPEG (Moving Picture Experts Group) and ITU-T's VCEG (Video Coding Experts Group) currently proceeds with 3D video standardization.

Figure 1:
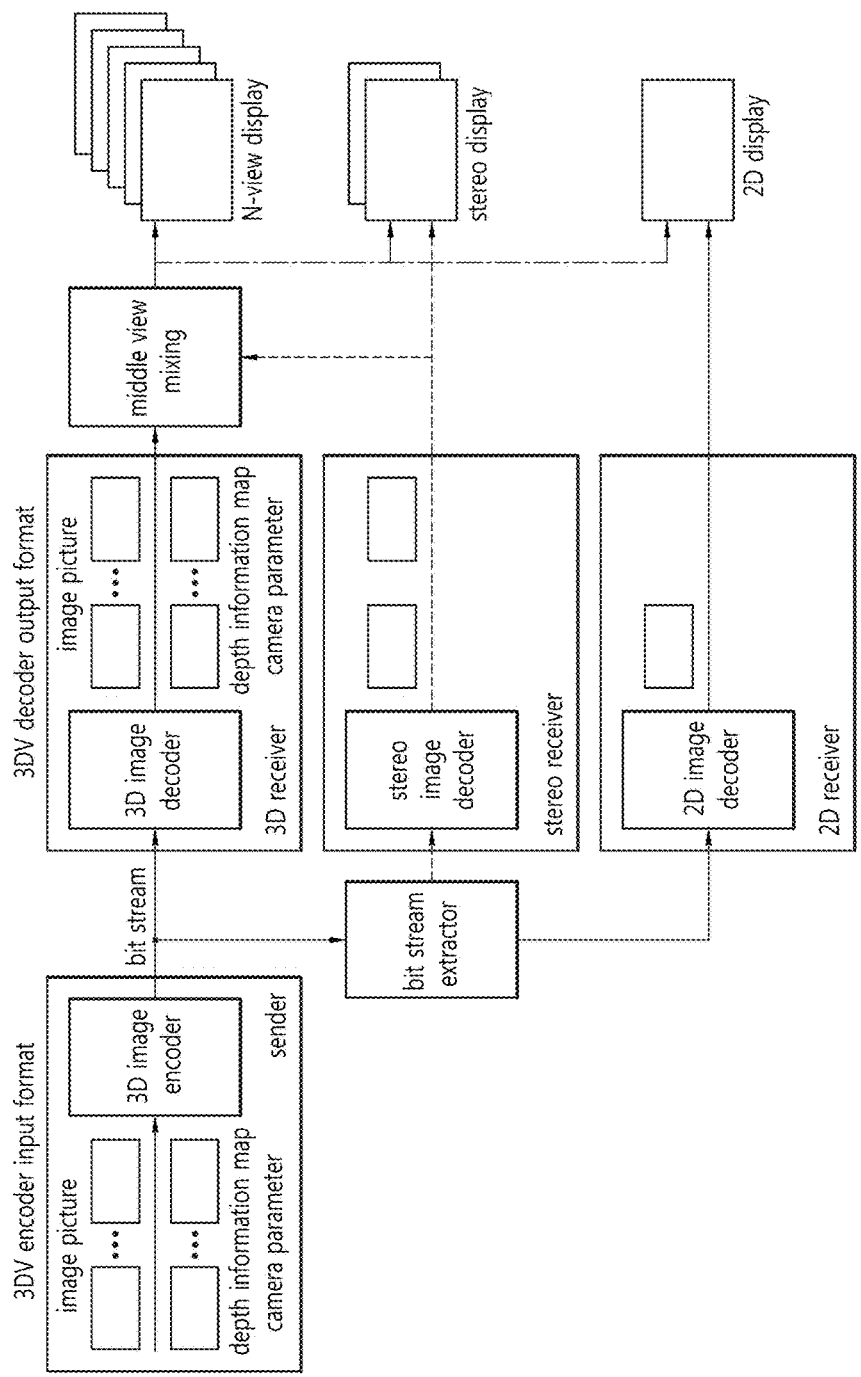
FIG. 1 is a view schematically illustrating a basic structure of a 3-dimensional (3D) video system.

FIG. 1 is a view schematically illustrating a basic structure of a 3-dimensional (3D) video system.

Referring to FIG. 1, the 3D video (3VD) system may include a sender and a receiver. In this case, the 3D video system of FIG. 1 may be a basic 3D video system as considered in 3D video standards that may include standards regarding advanced data formats and their related technologies that may support playback of autostereoscopic videos as well as stereoscopic videos using a true image and its corresponding depth information map.

The sender may generate a multi-view video content. Specifically, the sender may generate video information using a stereo camera and a multi-view camera and a depth information map (or depth view) using a depth information camera. The sender may convert a 2D video into a 3D video using a converter. The sender may generate an N ($\geq$2)-view (i.e., multi-view) image content using the generated video information and the depth information map. In this case, the N-view video content may contain N-view video information, its depth map information, and camera-related additional information. The N-view video content may be compressed by a 3D video encoder using a multi-view video encoding scheme, and the compressed video content (a bit stream) may be transmitted through a network to a terminal of the receiver.

The receiver may decode the video content received from the sender and may provide the multi-view video. Specifically, a video decoder (e.g., a 3D video decoder, a stereo video decoder, or a 2D video decoder) of the receiver may decode the received bit stream using a multi-view video decoding scheme to restore the bit stream into the N-view video. In this case, it may generate N (or more)-view virtual view videos using the restored N-view video and a depth image-based rendering (DIBR) process. The generated N (or more)-view virtual view videos are played by various 3D displays (e.g., an N-view display, a stereo display, or a 2D display), providing the user with a 3D effect.

Figure 2:
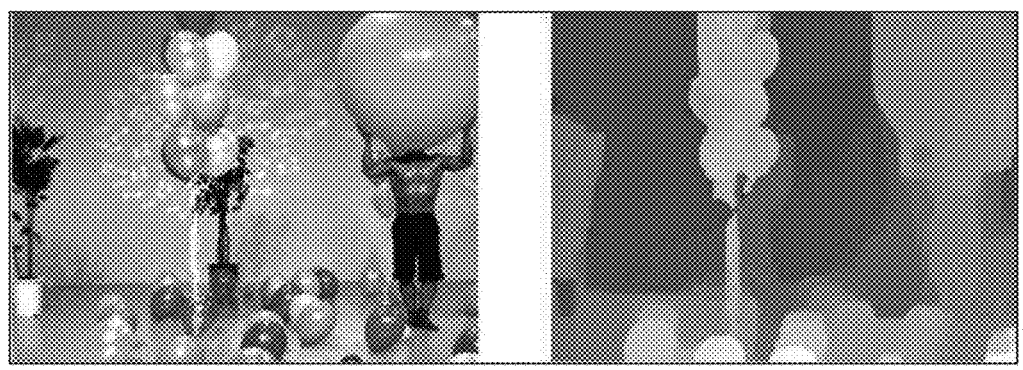
FIG. 2 is a view illustrating an example of a "balloons" video and an example of a depth information map video.

FIG. 2 is a view illustrating an example of a "balloons" video and an example of a depth information map video.

FIG. 2(a) shows "balloons" images used in the 3D video encoding standard of the MPEG that is an international standardization organization. FIG. 2(b) illustrates a depth information map video corresponding to the "balloons" video shown in FIG. 2(a). The depth information map video is the one obtained by representing depth information shown on the screen in eight bits per pixel.

The depth information map is used for generating virtual view videos, and the depth information map is the one obtained by representing the distance between a camera and a true object in the real-life world (depth information corresponding to each pixel at the same resolution as the actual video) in a predetermined number of bits. In this case, the depth information map may be obtained using the depth information map camera or using a true common image (texture).

The depth information map obtained using the depth information map camera offers high-reliable depth information primarily for a standstill object or scene, but the depth information map camera operates only within a predetermined distance. In this case, the depth information map camera may utilize a measuring scheme using a laser beam or structured light or based on time-of-flight of light (TFL).

The depth information map may be generated using a true common image (texture) and a disparity vector as well. The disparity vector means information representing the difference in view between two common videos. The disparity vector may be obtained by comparing a pixel at the current view and pixels at other views to discover the most similar one to the current view pixel and measuring the distance between the current view pixel and the most similar pixel.

The actual video and its depth information map may be a video(s) obtained by one or more cameras. The videos obtained by several cameras may be independently encoded and may be encoded/decoded using a typical 2D encoding/decoding codec. The videos obtained by several cameras have a correlation between their views, and for higher encoding efficiency, may be thus encoded using prediction between the different views.

The above-described 'depth information map' may mean a 'depth map' or 'depth picture, and hereinafter, the 'depth information map' may be interchangeably used with the 'depth map' or 'depth picture' for ease of description.

Figure 3:
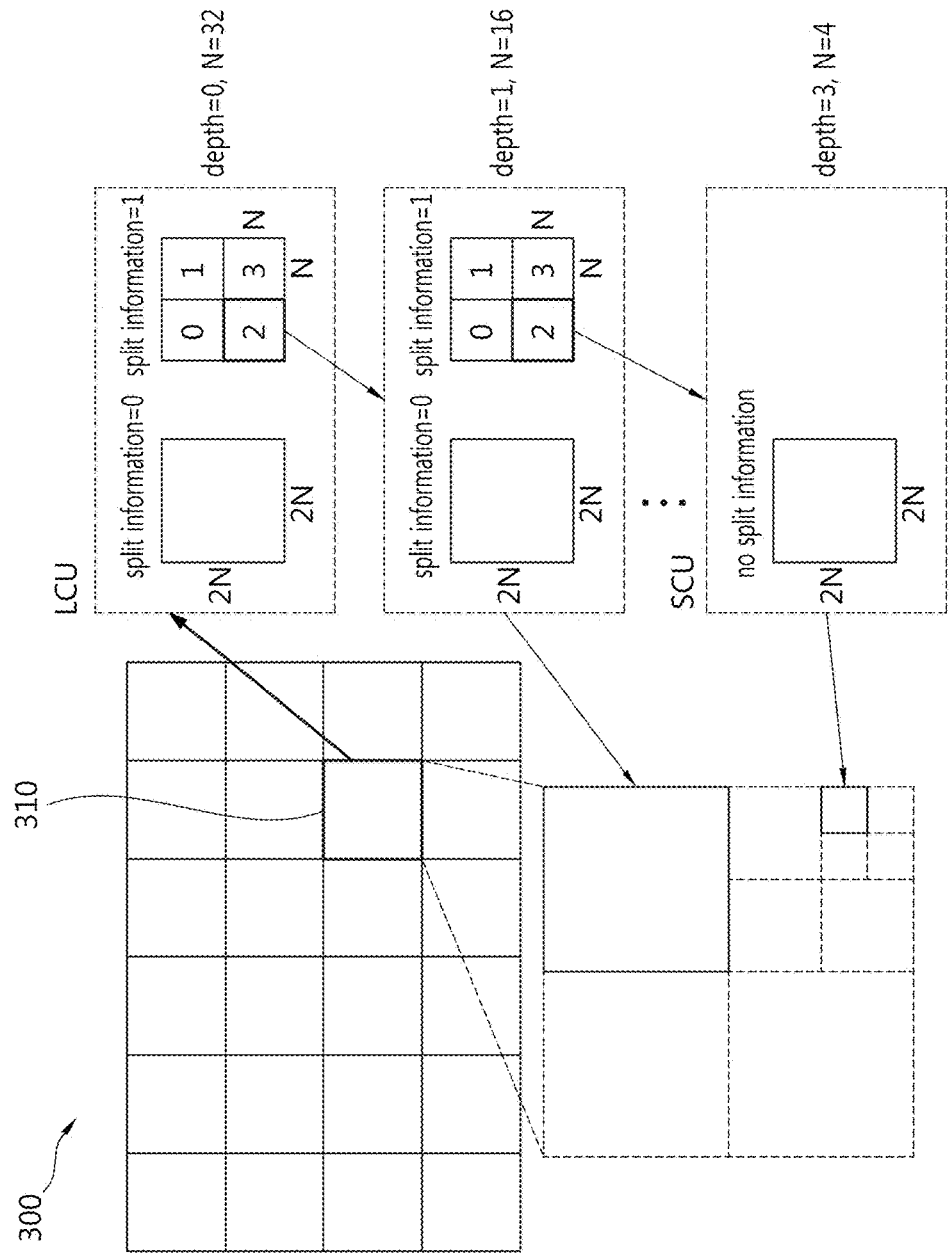
FIG. 3 is a view schematically illustrating a structure in which a video is split upon encoding and decoding the video.

FIG. 3 is a view schematically illustrating a structure in which a video is split upon encoding and decoding the video.

For efficient splitting, a video may be encoded and decoded for each coding unit (CU). The term "unit" refers to a block including a syntax element and video samples. A "unit is split" may mean that a block corresponding to the unit is split.

Referring to FIG. 3, a video 300 is sequentially split into largest coding units (LCU), and the split structure of each LCU is determined. As used herein, "LCU" may mean a coding tree unit (CTU). The split structure may mean a distribution of coding units (CU) for efficiently encoding the video in each LCU 310, and such distribution may be determined depending on whether to split one CU into four CUs each reduced in size by ½ the size of the CU in horizontal and vertical directions each. The split CU may be recursively split into four CUs each's size reduced to ½ thereof in horizontal and vertical directions each.

In this case, the splitting of a CU may be recursively performed to a predetermined depth. Depth information refers to information indicating the size of a CU and may be stored for each CU. For example, the depth of an LCU may be 0, and the depth of a smallest coding unit (SCU) may be a predetermined largest depth. Here, the LCU is a coding unit with the largest size as mentioned above, and the SCU is a coding unit with the smallest size.

Whenever an LCU 310 is split by half in horizontal and vertical directions each, the depth of the CU is increased by one. For example, if the size of a CU is 2N×2N at a certain depth L, the CU, if not split, has a size of 2N×2N, and if split, its size is reduced to N×N. In this case, the depth of the N×N-sized CU turns L+1. In other words, N, corresponding to the size of the CU, is reduced by half each time the depth is increased by one.

Referring to FIG. 3, the size of an LCU with a smallest depth of 0 may be 64×64 pixels, and the size of an SCU with a smallest depth of 3 may be 8×8 pixels. In this case, the depth of a CU (LCU) with 64×64 pixels may be represented as 0, a CU with 32×32 pixels as 1, a CU with 16×16 pixels as 2, and a CU (SCU) with 8×8 pixels as 3.

Further, information as to whether to split a particular CU may be represented through one-bit split information of the CU. The split information may be contained in all other CUs than SCUs. For example, if a CU is not split, 0 may be retained in the split information of the CU, and if split, 1 may be retained in the split information of the CU.

The above-described 'coding unit (CU)' may mean an 'encoding unit,' 'coding block,' or 'encoding block,' and hereinafter, the 'coding unit' may be interchangeably used with the 'encoding unit,' 'coding block,' or 'encoding block' for ease of description.

Figure 4:
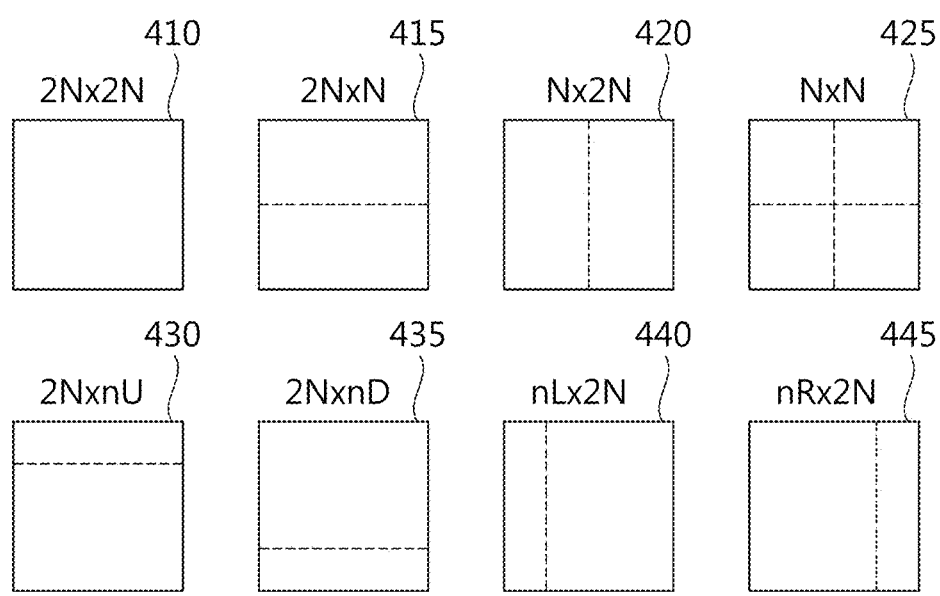
FIG. 4 illustrates prediction units that may be included in a coding unit (CU).

FIG. 4 illustrates prediction units that may be included in a coding unit (CU).

Among the CUs split from an LCU, a CU that is subjected to no further splitting may be split or partitioned into one more prediction units.

A prediction unit (hereinafter, "PU") is a basic unit in which prediction is conducted. A prediction unit is encoded and decoded in skip mode, inter mode, or intra mode. A prediction unit may be partitioned in various manners depending on the modes.

Referring to FIG. 4, the skip mode may support a 2N×2N mode 410 having the same size as a CU without splitting the CU.

The inter mode may support eight partitioned types for a CU, for example, a 2N×2N mode 410, a 2N×N mode 415, an N×2N mode 420, an N×N mode 425, a 2N×nU mode 430, a 2N×nD mode 435, an nL×2N mode 440, and an NR×2N mode 445.

The intra mode may support a 2N×2N mode 410 and an N×N mode 425 for a CU.

The above-described 'prediction unit (PU)' may mean a 'prediction block,' and hereinafter, the 'prediction unit' may be interchangeably used with the 'prediction block' for ease of description.

Figure 5:
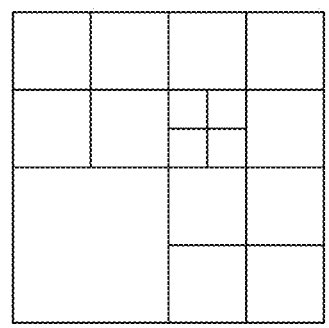
FIG. 5 schematically illustrates an example of a quad tree split structure of a transform unit (TU).

FIG. 5 schematically illustrates an example of a quad tree split structure of a transform unit (TU).

The transform unit (TU) is a basic unit used in the process of spatial transform and quantization in a CU. The TU may be shaped as a square or rectangle, and the TU may be included in the CU. The TU may be the same or smaller in size than the CU, and one CU may include a plurality of TUs having different sizes.

Further, the TU may have the same size as the CU, and the TU may be split from the CU using quad tree splitting. When the TU is split from the CU using a quad tree, the TU may recursively be split twice from the CU, in principle, but in this disclosure, as shown in FIG. 5, the case that the TU is recursively split from the CU three times or more is not excluded from the scope of the present invention.

For example, in case the CU has a size of 2N×2N, the TU may have a size of 2N×2N that is the same in size as the CU, and in case the TU is quad tree-split from the CU once, the TU may have a size of N×N. Further, in case the TU is split from the CU twice, the TU may have a size of N/2×N/2, and in case the TU is split from the CU three times, the TU may have a size of N/4×N/4.

The above-described 'transform unit (TU)' may mean a 'transform block,' and hereinafter, the 'transform unit' may be interchangeably used with the 'transform block' for ease of description.

Figure 6:
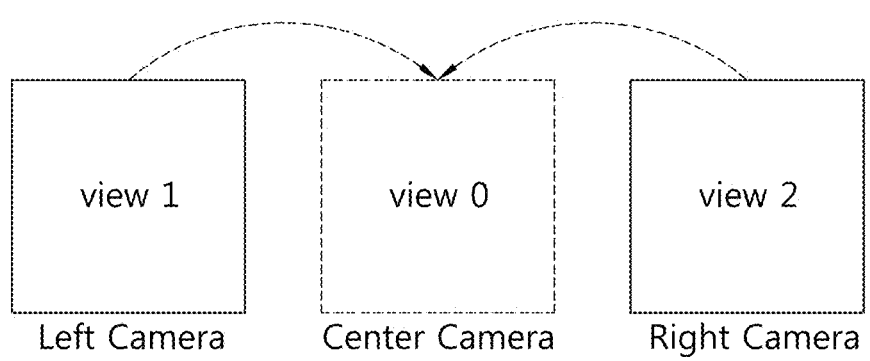
FIG. 6 illustrates an example of an inter view prediction structure in a 3D video codec.

FIG. 6 illustrates an example of an inter view prediction structure in a 3D video codec.

Inter-view prediction for view 1 and view 2 may be conducted using view 0 as a reference video, and view 0 should be encoded earlier than view 1 and view 2.

In this case, view 0 may be encoded independently from other views, and thus, view 0 is referred to as an independent view. In contrast, view 1 and view 2 that should use view 0 as reference video are referred to as dependent views. An independent view video may be encoded using a typical 2D video codec. On the contrary, dependent view videos need go through inter view prediction, and thus, these views may be encoded using a 3D video codec equipped with an inter view prediction process.

For increased encoded efficiency, view 1 and view 2 may be encoded using a depth information map. For example, a true image and a depth information map, when encoded, may be encoded and/or decoded independently from each other. Or, a true image and a depth information map, when encoded, may be encoded and/or decoded dependently upon each other as shown in FIG. 7.

Figure 7:
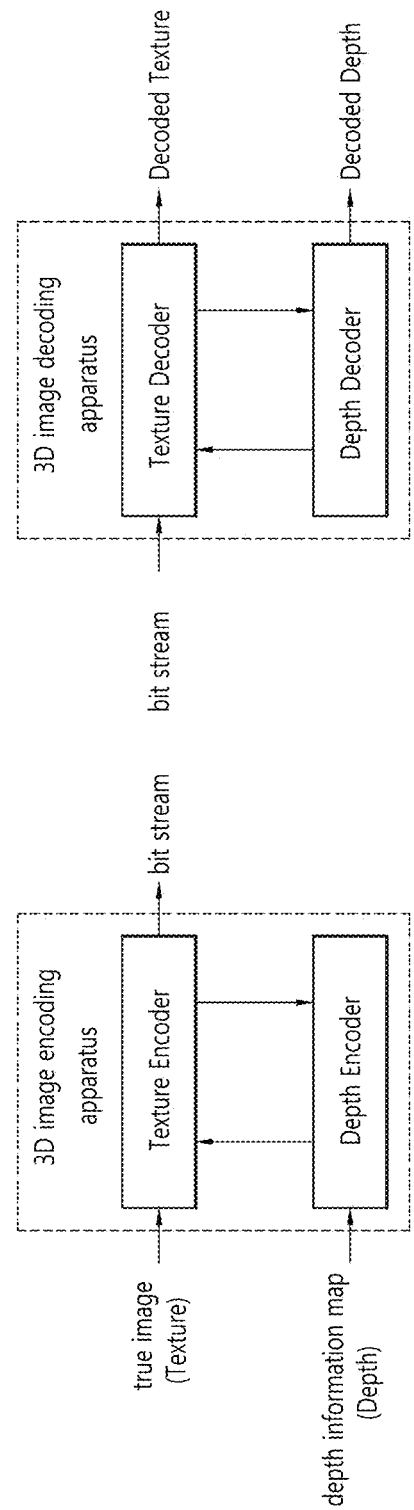
FIG. 7 illustrates an example of a process of encoding and/or decoding a true image (texture view) and a depth information map (depth view) in a 3D video encoder and/or decoder.

FIG. 7 illustrates an example of a process of encoding and/or decoding a true image (texture view) and a depth information map (depth view) in a 3D video encoder and/or decoder.

Referring to FIG. 7, the 3D video encoder may include a true image encoder (texture encoder) for encoding a true image (texture view) and a depth information map encoder (depth encoder) for encoding a depth information map (depth view).

In this case, the actual video encoder may encode the actual video using the depth information map encoded by the depth information map encoder. In contrast, the depth information map encoder may encode the depth information map using the actual video encoded by the actual video encoder.

The 3D video decoder may include a true image decoder (texture decoder) for decoding a true image and a depth information map decoder for decoding a depth information map.

In this case, the actual video decoder may decode the actual video using the depth information map decoded by the depth information map decoder. In contrast, the depth information map decoder may decode the depth information map using the actual video decoded by the actual video decoder.

Figure 8:
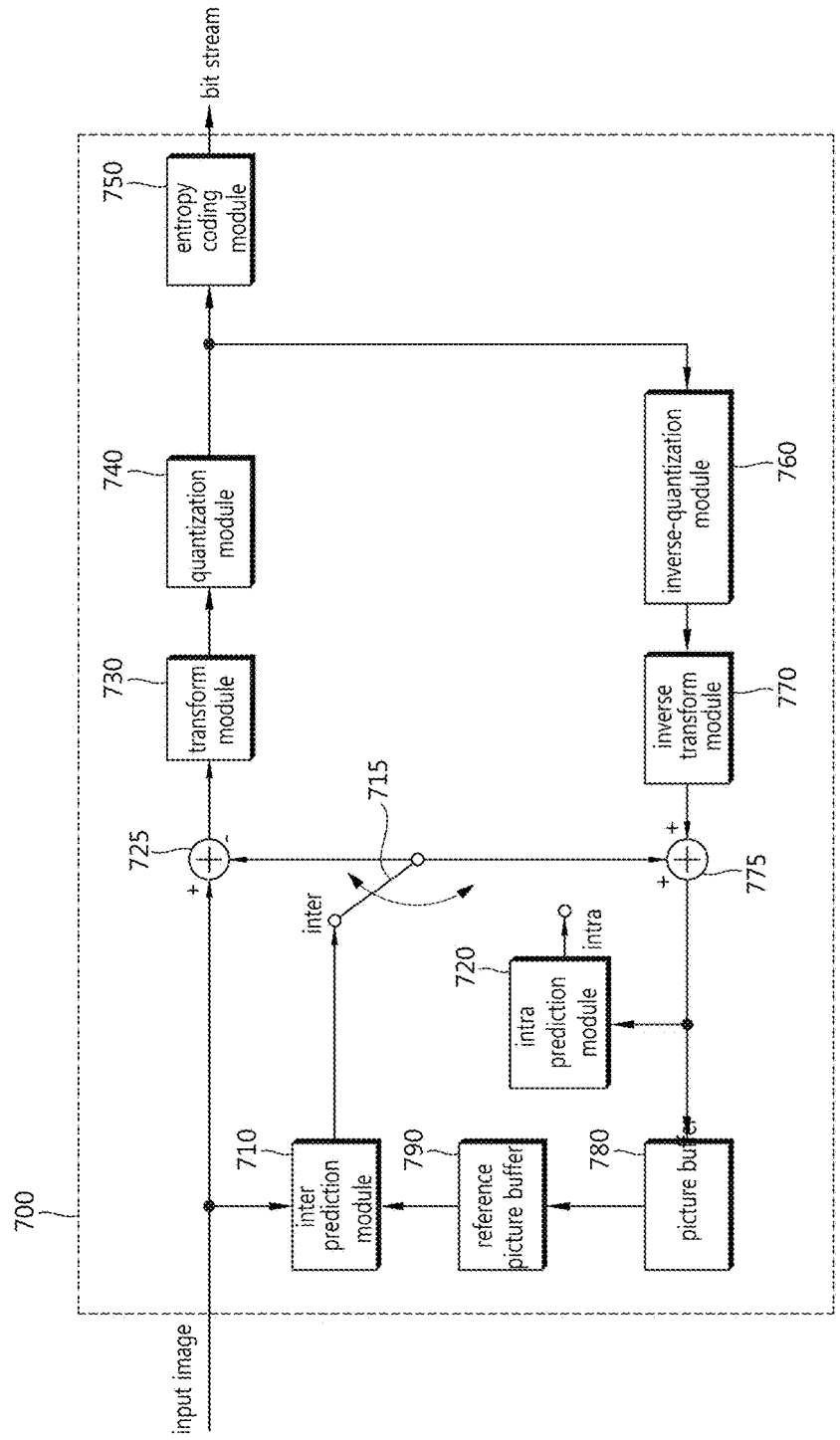
FIG. 8 is a block diagram illustrating a configuration of a video encoder according to an embodiment of the present invention.

FIG. 8 is a block diagram illustrating a configuration of a video encoder according to an embodiment of the present invention.

FIG. 8 illustrates an example video encoder applicable to a multi-view structure that may be implemented by extending a single view-structured video encoder. In this case, the video encoder of FIG. 8 may be used in a true image encoder and/or depth information map encoder as shown in FIG. 7, and the encoder may mean an encoding device.

Referring to FIG. 8, the video encoder 800 includes an inter prediction module 810, an intra prediction module 820, a switch 815, a subtractor 825, a converter 830, a quantization module 840, an entropy coding module 850, an inverse-quantization module 860, an inverse converter 870, an adder 875, a filter 880, and a reference picture buffer 890.

The video encoder 800 may perform encoding on an input image in intra mode or inter mode to output a bit stream.

Intra prediction means intra picture prediction, and inter prediction means inter picture or inter view prediction. In intra mode, the switch 815 switches to intra mode, and in inter mode, the switch 815 switches to inter mode.

The video encoder 800 may generate a prediction block for a block (current block) of the input picture and then encode a differential between the current block and the prediction block.

In intra mode, the intra prediction module 820 may use as its reference pixel a pixel value of an already encoded neighboring block of the current block. The intra prediction module 820 may generate prediction samples for the current block using the reference pixel.

In inter mode, the inter prediction module 810 may obtain a motion vector specifying a reference block corresponding to the input block (current block) in a reference picture stored in the reference picture buffer 890. The inter prediction module 810 may generate the prediction block for the current block by performing motion compensation using the reference picture stored in the reference picture buffer 890 and the motion vector.

In a multi-view structure, inter prediction applying to inter mode may include inter view prediction. The inter prediction module 810 may configure an inter view reference picture by sampling a reference view picture. The inter prediction module 810 may conduct inter view prediction using a reference picture list including the inter view reference picture. A reference relation between views may be signaled through information specifying inter view dependency.

Meanwhile, in case the current view picture and the reference view picture have the same size, sampling applying to the reference view picture may mean generation of a reference sample by sample copying or interpolation from the reference view picture. In case the current view picture and the reference view picture have different sizes, sampling applying to the reference view picture may mean upsampling or downsampling. For example, in case views have different resolutions, a restored picture of the reference view may be upsampled to configure an inter view reference picture.

Which view picture is to be used to configure an inter view reference picture may be determined considering, e.g., encoding costs. The encoder may send to a decoding device information specifying a view to which a picture to be used as an inter view reference picture belongs.

A picture used to predict the current block in a view referenced in inter view prediction—that is, reference view—may be the same as a picture of the same access unit (AU) as the current picture (picture targeted for prediction in the current view).

The subtractor 825 may generate a residual block (residual signal) by a differential between the current block and the prediction block.

The converter 830 may transform the residual block into a transform coefficient, and the converter 830 may perform transform using a transform block. In transform skip mode, the converter 830 may skip the conversion of the residual block.

The quantization module 840 quantizes the transform coefficient into a quantized coefficient according to quantization parameters.

The entropy coding module 850 may entropy-encode values produced from the quantization module 840 or encoding parameter values produced during the course of encoding according to probability distributions to output a bit stream. The entropy coding module 850 may also entropy-encode information (e.g., syntax element) for video decoding in addition to the pixel information of the video.

The encoding parameters may include, as information necessary for encoding and decoding, information inferable in the course of encoding or decoding, as well as information such as syntax element encoded by the encoder and transferred to the decoding device.

The residual signal may mean a difference between the original signal and the prediction signal, a signal obtained by transforming the difference between the original signal and the prediction signal, or a signal obtained by transforming the difference between the original signal and the prediction signal and quantizing the transformed difference. From a block perspective, the residual signal may be denoted a residual block.

In case entropy encoding applies, symbols may be represented in such a way that a symbol with a higher chance of occurrence is assigned fewer bits while another with a lower chance of occurrence is assigned more bits, and accordingly, the size of a bit stream for symbols targeted for encoding may be reduced. As such, video encoding may have an increased compression capability through entropy encoding.

Entropy encoding may employ an encoding scheme such as exponential Golomb, context-adaptive variable length coding (CAVLC), or context-adaptive binary arithmetic coding (CABAC). For example, the entropy coding module 850 may perform entropy encoding using a variable length coding/code (VLC) table. The entropy coding module 850 may derive a binarization method and a target symbol and a probability model of the target symbol/bin and may perform entropy encoding using the derived binarization method and probability model.

The quantized coefficient may be inverse-quantized by the inverse-quantization module 860 and may be inverse transformed by the inverse converter 870. The inverse-quantized and inverse-transformed coefficient is added to the prediction block by the adder 875, thus producing a restored block.

The restored block goes through the filter 880. The filter 880 may apply at least one or more of a deblocking filter, a sample adaptive offset (SAO), and an adaptive loop filter (ALF) to the restored block or restored picture. The restored block, after having gone through the filter 880, may be stored in the reference picture buffer 890.

Figure 9:
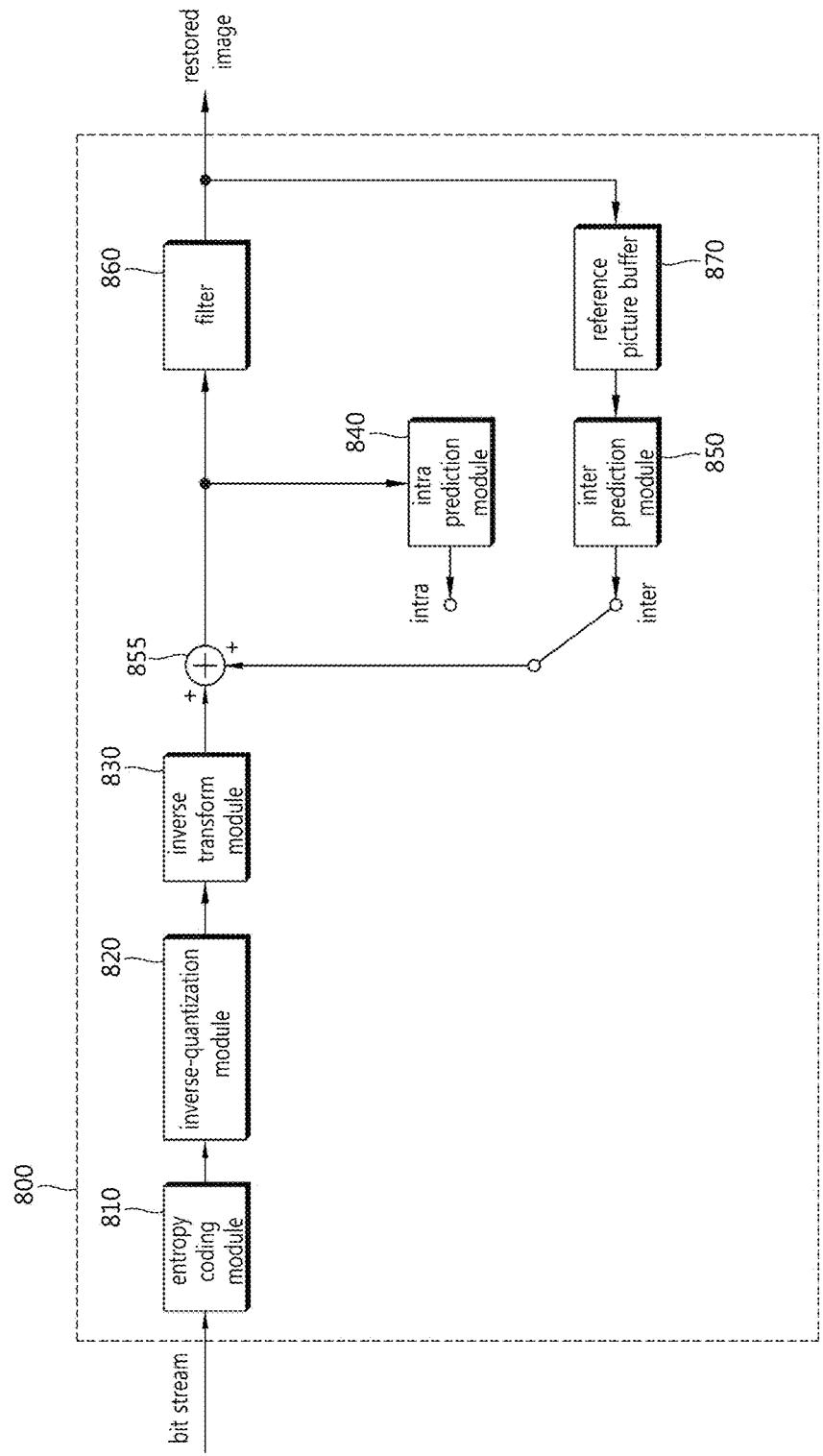
FIG. 9 is a block diagram illustrating a configuration of a video decoder according to an embodiment of the present invention.

FIG. 9 is a block diagram illustrating a configuration of a video decoder according to an embodiment of the present invention.

FIG. 9 illustrates an example video decoder applicable to a multi-view structure that may be implemented by extending a single view-structured video decoder.

In this case, the video decoder of FIG. 9 may be used in a true image decoder and/or depth information map decoder as shown in FIG. 7. For ease of description, as used herein, the terms "decrypting" and "decoding" may be interchangeably used, or the terms "decoding device" and "decoder" may be interchangeably used.

Referring to FIG. 9, the video decoder 900 includes an entropy coding module 910, an inverse-quantization module 920, an inverse-converter 930, an intra prediction module 940, an inter prediction module 950, a filter 960, and a reference picture buffer 970.

The video decoder 900 may receive the bit stream from the encoder, decode the bit stream in intra mode or inter mode, and output a reconstructed video, i.e., a restored video.

In intra mode, the switch may switch to intra prediction, and in inter mode, the switch may switch to inter prediction.

The video decoder 900 may obtain a residual block restored from the received bit stream, generate a prediction block, and add the restored residual block and the prediction block to generate a reconstructed block, i.e. restored block.

The entropy coding module 910 may entropy-decode the received bit stream according to a probability distribution into information such as a quantized coefficient and syntax element.

The quantized coefficient is inverse-quantized by the inverse-quantization module 920 and is inverse transformed by the inverse converter 930. The quantized coefficient may be inverse-quantized/inverse-transformed into a restored residual block.

In intra mode, the intra prediction module 940 may generate a prediction block for the current block using a pixel value of an already encoded neighboring block of the current block.

In inter mode, the inter prediction module 950 may generate the prediction block for the current block by performing motion compensation using the reference picture stored in the reference picture buffer 970 and the motion vector.

In a multi-view structure, inter prediction applying to inter mode may include inter view prediction. The inter prediction module 950 may configure an inter view reference picture by sampling a reference view picture. The inter prediction module 950 may conduct inter view prediction using a reference picture list including the inter view reference picture. A reference relation between views may be signaled through information specifying inter view dependency.

Meanwhile, in case the current view picture (current picture) and the reference view picture have the same size, sampling applying to the reference view picture may mean generation of a reference sample by sample copying or interpolation from the reference view picture. In case the current view picture and the reference view picture have different sizes, sampling applying to the reference view picture may mean upsampling or downsampling.

For example, in case inter view prediction applies to views with different resolutions, a restored picture of the reference view may be upsampled to configure an inter view reference picture.

In this case, information specifying a view to which a picture to be used as an inter view reference picture belongs may be transmitted from the encoder to the decoder.

A picture used to predict the current block in a view referenced in inter view prediction—that is, reference view—may be the same as a picture of the same access unit (AU) as the current picture (picture targeted for prediction in the current view).

The restored residual block and the prediction block are added by the adder 955 into a restored block. In other words, the residual sample and the prediction sample are added to each other into a restored sample or restored picture.

The restored picture is filtered by the filter 960. The filter 960 may apply at least one or more of a deblocking filter, an SAO, and an ALF to the restored block or restored picture. The filter 960 outputs a reconstructed (modified) or filtered restored picture (reconstructed picture). The restored video is stored in the reference picture buffer 970 for use in inter prediction.

Although in the embodiment described in connection with FIGS. 8 and 9 the modules perform their respective functions different from each other, the present invention is not limited thereto. For example, one module may perform two or more functions. For example, the respective operations of the intra prediction module and the inter prediction modules as shown in FIGS. 8 and 9 may be carried out by one module (a predicting unit).

Meanwhile, as described above in connection with FIGS. 8 and 9, one encoder/decoder performs encoding/decoding on all of the multiple views. However, this is merely for ease of description, and separate encoders/decoders may be configured for the multiple views, respectively.

In such case, the encoder/decoder for the current view may perform encoding/decoding on the current view using information regarding other view. For example, the predicting unit (inter prediction module) for the current view may perform intra prediction or inter prediction on the current block using the pixel information or restored picture information of other view.

Although inter view prediction is described herein, a current layer may be encoded/decoded using information on other view regardless of whether an encoder/decoder is configured for each view or one device processes multiple views.

The description of views according to the present invention may apply likewise to layers supportive to scalability. For example, the view as described herein may be a layer.

Figure 10:
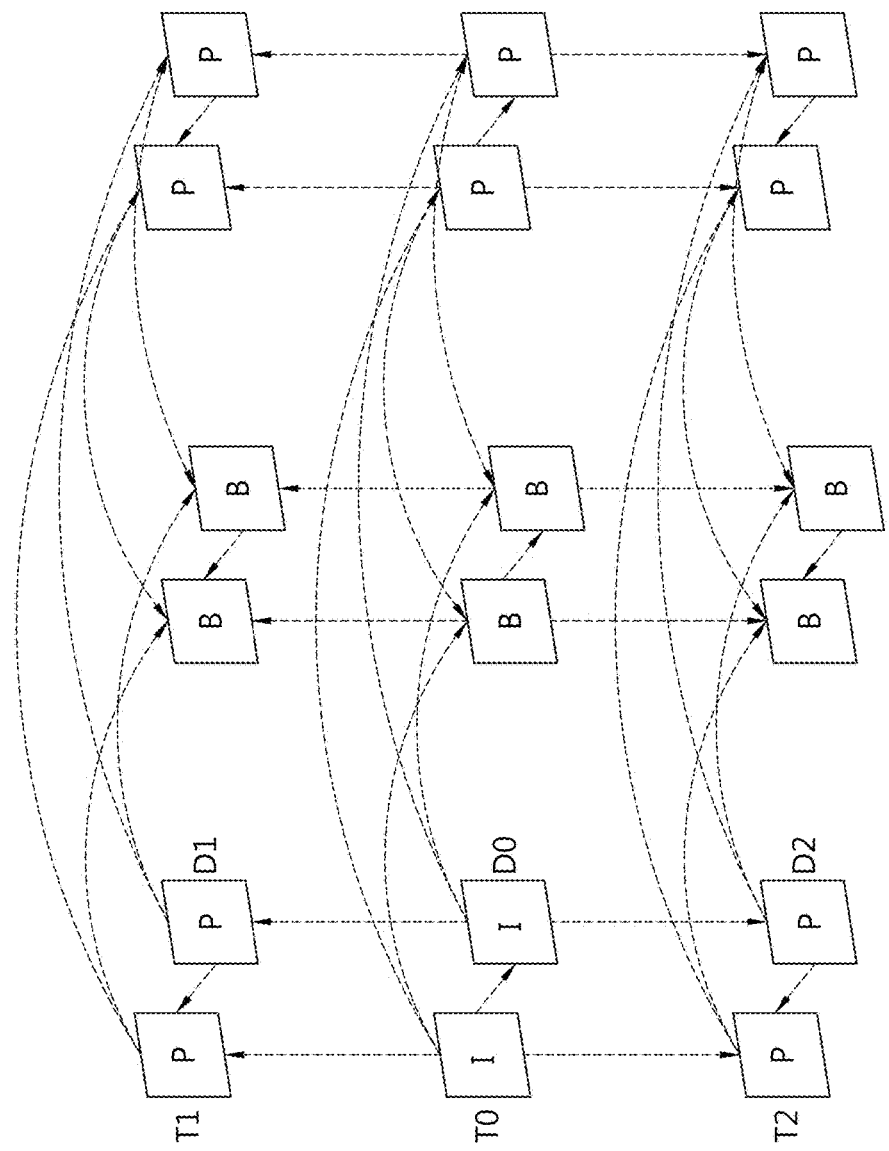
FIG. 10 is a view illustrating an exemplary prediction structure for a 3D video codec.

FIG. 10 is a view illustrating an exemplary prediction structure for a 3D video codec. For ease of description, FIG. 10 illustrates a prediction structure for encoding actual videos obtained by three cameras and depth information maps respectively corresponding to the actual videos.

As shown in FIG. 10, the three actual videos respectively obtained from the three cameras are denoted T0, T1, and T2 according to views, and the three depth information maps respectively corresponding to the three actual videos are denoted D0, D1, and D2 according to the views. Here, T0 and D0 are videos obtained at view 0, T1 and D1 at view 1, and T2 and D2 at view 2. In this case, the squares shown in FIG. 10 are videos (pictures).

The videos (pictures) are classified into an I picture (intra picture), a P picture (uni-prediction picture), and a B picture (bi-prediction picture) depending on encoding/decoding types, and each picture may be encoded/decoded depending on its encoding/decoding type. For I pictures, images themselves are encoded without going through inter prediction. For P pictures, only uni-directionally present reference images may be subjected to inter prediction, and for B pictures, bi-directionally present reference images may be subjected to inter prediction. In this case, the arrows shown in FIG. 10 denote directions of prediction. In other words, a true image and its depth information map may be co-dependently encoded/decoded depending on prediction directions.

Motion information on the current block is needed to encode/decode an image through inter prediction. To infer the motion information on the current block, the following may come in use: a method using motion information on a block adjacent to the current block, a method using a temporal correlation within the same view, and a method using an inter-view correlation at a neighboring view. The above-described inter prediction methods may be used in combination for one picture. Here, the current block refers to a block where prediction is performed. The motion information may mean a motion vector, a reference image number, and/or a prediction direction (e.g., whether it is uni-directional prediction or bi-directional prediction, whether it uses a temporal correlation, or whether an inter-view correlation is used, etc.).

In this case, the prediction direction may typically come with uni-directional prediction and bi-directional prediction depending on whether a reference picture list (RefPicList) is used or not. The bi-directional prediction is classified into forward prediction (Pred_L0: Prediction L0) using a forward reference picture list (LIST 0, L0) and backward prediction (Pred_L1: Prediction L1) using a backward reference picture list (LIST 1, L1). Further, the bi-directional prediction Pred_BI: Prediction BI) using both the forward reference picture list (LIST 0) and the backward reference picture list (LIST 1) may indicate that there is both forward prediction and backward prediction. Even the case where the forward reference picture list (LIST 0) is copied to the backward reference picture list (LIST 1) so that two processes of forward prediction are present may also belong to the category of bi-directional prediction.

A prediction direction may be defined using predFlagL0 and predFlagL1. In this case, predFlagL0 is an indicator indicating whether the forward reference picture list (List 0) is used, and predFlag1 is an indicator indicating whether the backward reference picture list (List 1) is used. For example, in the case of uni-directional prediction and forward prediction, predFlagL0 may be '1', and predFlagL1 may be '0'; in the case of uni-directional prediction and backward prediction, predFlagL0 '0,' and predFlagL1 '1';' and in the case of bi-directional prediction, predFlagL0 '1,' and predFlagL1 '1.'

Motion prediction methods includes 1) a method using a motion vector predictor and a motion vector difference and 2) a merge motion deriving method, i.e., merge method, using a flag (merge_flag) indicating whether motion merge is to be used and an index (merge_idx) that is information regarding a position where a motion is to be inherited. Hereinafter, the merge is described in greater detail.

Figure 11:
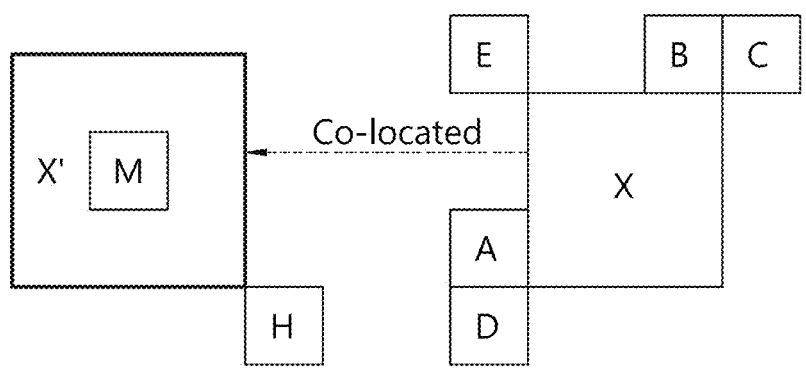
FIG. 11 illustrates an example in which neighboring blocks are used to configure a merge candidate list for a current block.

FIG. 11 illustrates an example in which neighboring blocks are used to configure a merge candidate list for a current block.

Merge mode is a method for performing inter prediction. Merge mode may employ motion information on neighboring blocks of a current block as motion information on the current block (for example, at least one of a motion vector, a reference picture list, and a reference picture index). In this case, the use of the motion information on the neighboring blocks as motion information on the current block is referred to as merging, motion merging, or merging motion.

In merge mode, per-coding unit (CU) merging motion and per-prediction unit (PU) merging motion are possible.

The case where merging motion is made on a per-block (e.g., CU or PU) basis (for ease of description, hereinafter "block") requires information regarding whether the merging motion is performed per block partition and information regarding which one of neighboring blocks of the current block the merging motion is performed with.

A merge candidate list may be configured to perform merging motion, i.e., a merge motion candidate list.

The merge candidate list refers to a list of pieces of motion information, and this may be generated before merge mode is performed. Here, the motion information of the merge candidate list may be motion information on the neighboring blocks of the current block or motion information newly created by combining the pieces of motion information already present in the merge candidate list. The motion information on a neighboring block (for example, a motion vector and/or reference picture index) may be motion information specified by the neighboring block or motion information stored in the neighboring block (or used to decode the neighboring block).

In this case, the neighboring blocks, as shown in FIG. 11, may include neighboring blocks A, B, C, D and E positioned spatially adjacent to the current block and a co-located block H or M temporally corresponding to the current block. The co-located candidate block refers to a block located at a corresponding position in a co-located picture temporally corresponding to the current picture including the current block. If the H block is available in the co-located picture, the H block may be determined as the co-located candidate block, and if unavailable, the M block in the co-located picture may be determined as the co-located candidate block.

Upon configuring the merge candidate list, it is determined whether the motion information on the neighboring blocks (A, B, C, D, and E) and the co-located candidate block (H or M) may be used as merge candidate to configure the merge candidate list of the current block. In other words, motion information on blocks available for inter prediction of the current block may be added to the merge candidate list as merge candidate.

For example, as a method for configuring a merge candidate list for an X block, 1) in case a neighboring block A is available, the neighboring block A is added to the merge candidate list. 2) thereafter, only when the motion information on neighboring block B is not the same as the motion information on neighboring block A, neighboring block B is added to the merge candidate list. 3) in the same manner, only when the motion information on neighboring block C differs from the motion information on neighboring block B, neighboring block C is added to the merge candidate list, and 4) only when the motion information on neighboring block D differs from the motion information on neighboring block C, neighboring block D is added to the merge candidate list. Further, 5) only when the motion information on neighboring block E is different from the motion information on neighboring block D, neighboring block E may be added to the merge candidate list, and 6) finally, neighboring block H (or M) is added to the merge candidate list. In sum, the neighboring blocks may be added to the merge candidate list in the order of A→B→C→D→E→H (or M). Here, the same motion information may mean using the same motion vector, the same reference picture, and the same prediction direction (uni-directional or bi-directional).

The phrases "adding a neighboring block to a merge candidate list as merge candidate" and "adding motion information to a merge candidate list as merge candidate" are mixed up herein for ease of description, although the two phrases are substantially the same in meaning. For example, a neighboring block as merge candidate may mean motion information on the block.

Figure 12:
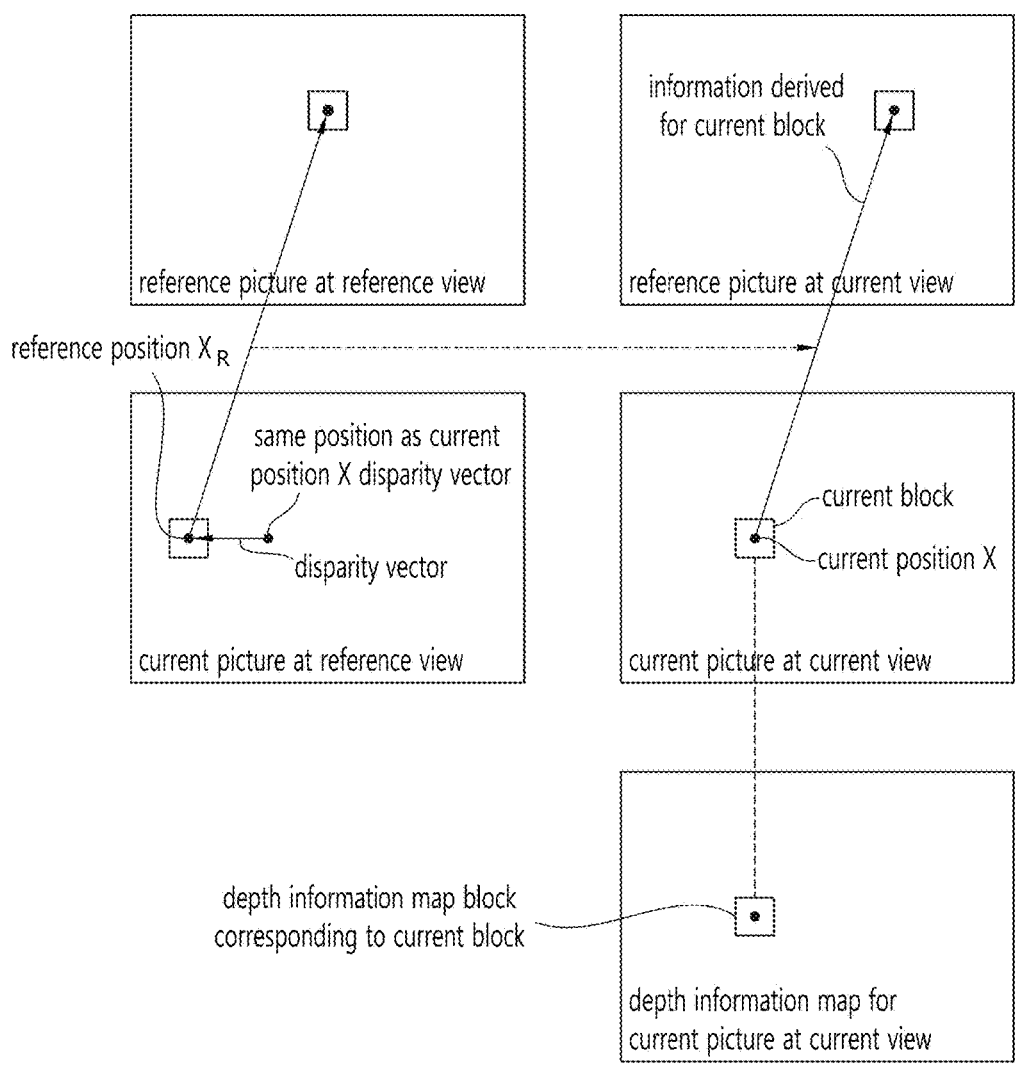
FIG. 12 is a view illustrating an exemplary process of deriving motion information on a current block using motion information at a neighboring view.

FIG. 12 is a view illustrating an exemplary process of deriving motion information on a current block using motion information at a neighboring view.

In connection with FIG. 12, only one view is used to derive the motion information on the current block merely for ease of description. However, there may be two or more neighboring views.

Referring to FIG. 12, a 3D video system may use motion information at a neighboring view in order to efficiently encode/decode motion information. Specifically, the current block shown in FIG. 12 (the block at current location X) searches a target block (reference location XR) located at a neighboring view in order to derive the motion information on the current block. In this case, the target block at the neighboring view means a block corresponding to the current block. Since only a difference in current picture between the current view and the reference view lies in the position of cameras, the target block at the neighboring view may be derived from the disparity vector (DV) as described above.

Figure 13:
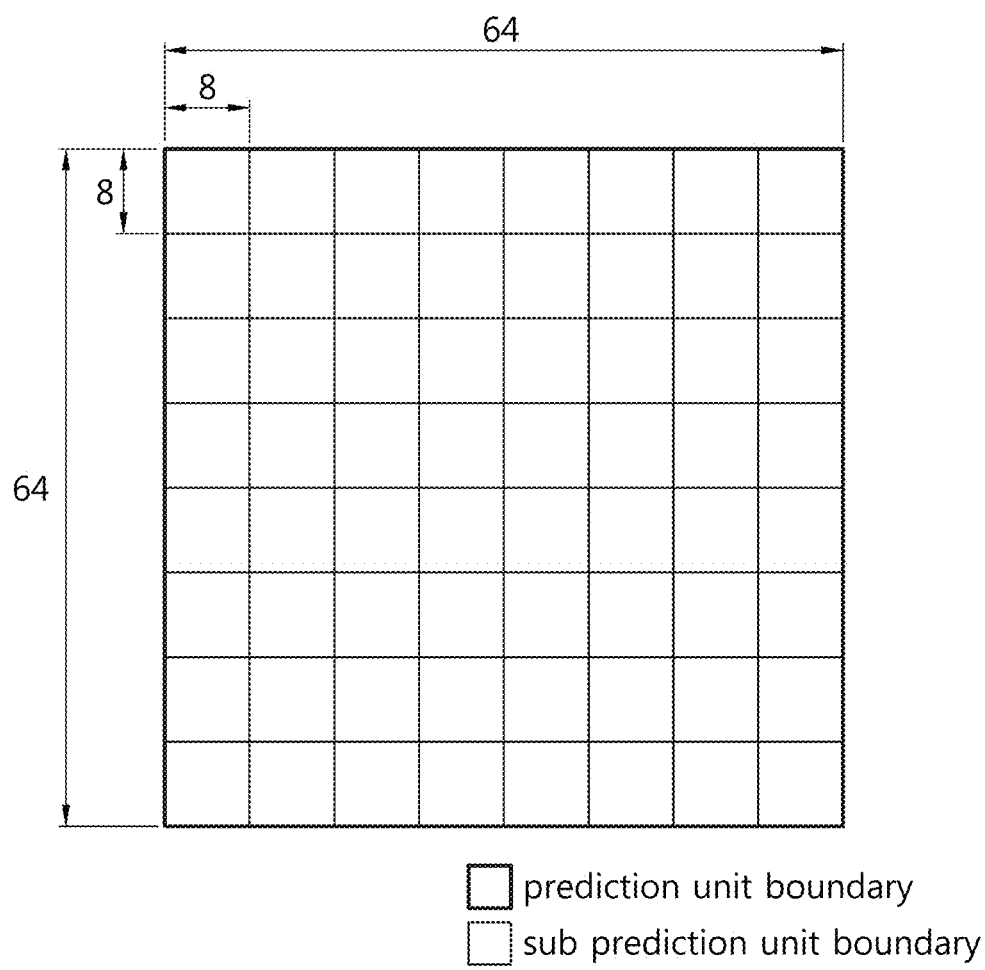
FIG. 13 is a view illustrating an example in which one prediction unit (PU) is split into several sub prediction units.

FIG. 13 is a view illustrating an example in which one prediction unit (PU) is split into several sub prediction units.

In the example illustrated in FIG. 13, a prediction unit with a size of 64×64 is divided into sub prediction units each with a size of 8×8. For ease of description in connection with FIG. 13, the size of the prediction unit is 64×64, but without limited thereto, the size may be 32×32, 16×16, 8×8, or 4×4. In a 3D video system, one prediction unit may be split into a number of sub prediction units. In this case, derivation of motion information using a disparity vector is carried out on a per-sub prediction unit basis. The sub prediction unit may have a predetermined size (e.g., 4×4, 8×8, or 16×16), and the size of the sub prediction unit may be designated upon encoding. Information on the size of the sub prediction unit may be included and signaled in a video parameter set (VPS) extension syntax.

Figure 14:
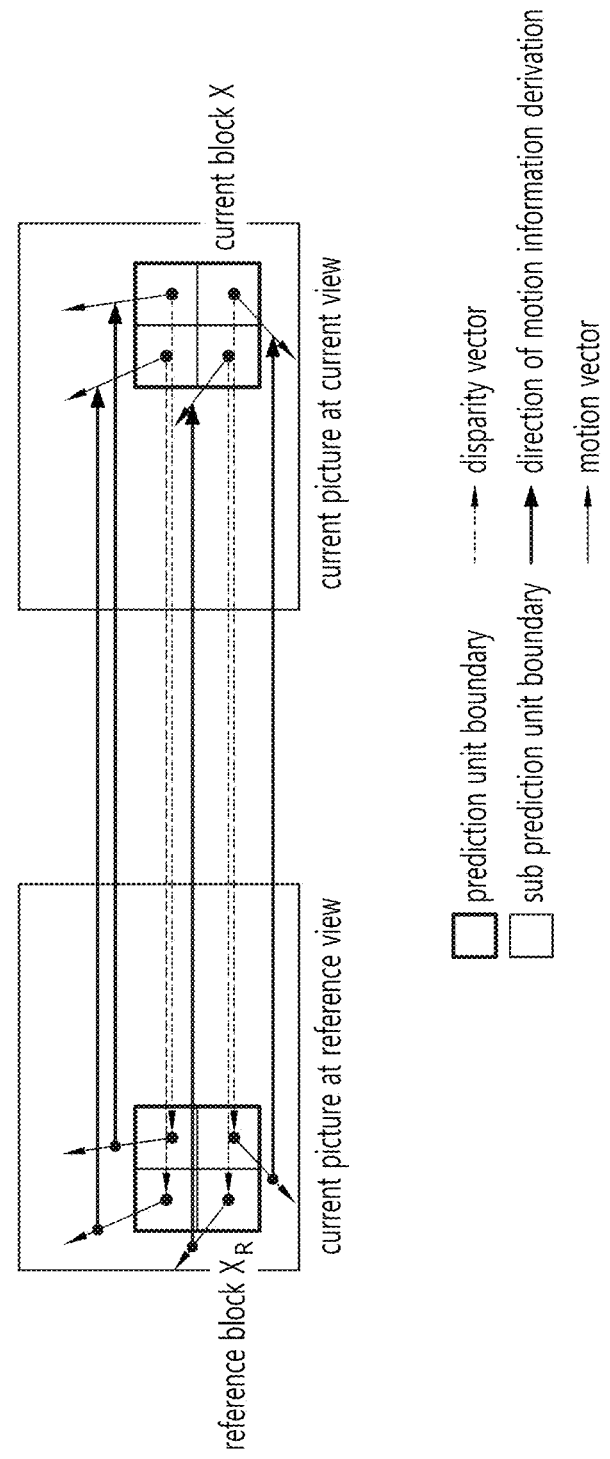
FIG. 14 is a view illustrating an exemplary process of deriving motion information on a current block using a reference block.

FIG. 14 is a view illustrating an exemplary process of deriving motion information on a current block using a reference block.

The process of deriving motion information on a current block means setting up the motion information present in the reference block with the motion information on the current block, and deriving motion information is typically performed per prediction block. However, a 3D video system may derive motion information on a per-sub prediction unit basis, as well as on a per-prediction block basis, for the current block X positioned in the current picture at the current view in order to efficiently encode/decode motion information.

In other words, the 3D video system may set the motion information present in the sub prediction unit of the reference block XR to the motion information on the sub prediction unit of the current block X. In this case, the reference block XR may mean a reference block XR positioned in the current picture at the reference view. A specific process of deriving motion information is described below.

The inter prediction module, as described above, may derive motion information on a per-sub prediction unit basis as well as on a per-prediction unit basis in the derived reference block of the reference view. When the inter prediction module brings the motion information on a per-sub prediction unit basis in the derived reference block of the reference view, all of the sub prediction units do not have motion information. That is, there is a portion in the reference block from which no motion information can be brought. In order to compensate for the case where no motion information can be brought in the reference block, the inter prediction module examines whether there is motion information available for the sub prediction unit positioned at the center of the reference block.

In case there is motion information available for the sub prediction unit positioned at the center of the reference block, the inter prediction module stores the motion information present in the sub prediction unit positioned at the center of the reference block in a storage space. The storage space may mean a separate storage device present outside the video encoding/decoding apparatus or may be positioned inside the video encoding/decoding apparatus. Further, the storage space may mean a memory or processor, and the storage space may mean not a physical space but a virtual, i.e., logical storage space. In this case, the motion information stored in the storage space may mean initial motion information.

When the inter prediction module derives motion information for the sub prediction unit of the current block, if there is no motion information in the sub prediction unit of the reference block corresponding to the sub prediction unit of the current block, the above-described initial motion information may be used as motion information for the sub prediction unit of the current block. In case there is no motion information available for the sub prediction unit positioned at the center of the reference block, the inter prediction module might not use temporal inter-view motion information prediction. In this case, the motion information may be used as a motion merge candidate, i.e., a merge candidate.

When configuring a merge motion candidate list, i.e., a merge candidate list, in a 3D image, a merge candidate may be derived 1) in the existing 2D image encoding/decoding (e.g., HEVC, etc.), and then, a merge candidate may be Derived in 2) 3D image encoding/decoding (e.g., 3D-HEVC etc.). Although it has been described that a merge candidate is derived in 3D image encoding/decoding after a merge candidate is derived in 2D image encoding/decoding for ease of description, the present disclosure is not limited to the above-described order of deriving merge candidates. Further, although, in configuring a merge candidate list, merge candidates are arranged according to a predetermined order in principle, adaptive rearrangement of merge candidates depending on image encoding/decoding circumstances is not excluded from the scope of the present invention.

Existing 2D image encoding/decoding merge candidates may mean motion information of blocks spatially or temporally adjacent to the current block, and 3D image encoding/decoding merge candidates may mean merge candidates added to fit the characteristics of a 3D image.

Here, the motion information of the blocks spatially or temporally adjacent to the current block may include candidates A0, A1, B0, B1, and Col (H or M). A1 may mean motion information of a block positioned at a left side of the block targeted for prediction as described above, and B1 may mean motion information of a block positioned at an upper side of the block targeted for prediction as described above. B0 may mean motion information of a block positioned at a right and upper side of the block targeted for prediction as described above, A0 motion information of a block positioned at a left and lower side of the block targeted for prediction as described above, and B2 motion information of a block positioned at a left and upper side of the block targeted for prediction as described above. Further, Col (H or M) may mean motion information derived through a block located at a corresponding position in the co-located picture temporally corresponding to the current picture including the current block as described above. Further, the merge candidates added to fit the characteristics of the 3D image may include a motion parameter inheritance (MPI) candidate, an inter-view merge candidate (IvMC), an inter-view disparity vector candidate (IvDC), a view synthesis prediction (VSP) candidate, a shift inter-view (ShiftIV) candidate, a BI candidate, and a Zero candidate. Here, the MPI may mean motion information inheriting motion information of the true image, the IvMC motion information using inter-view merge, and the IvDC motion information derived using the above-described disparity vector (i.e., using a view disparity). Further, the VSP may mean motion information derived by synthesizing a view, and the ShiftIV motion information derived using a corrected view disparity. The BI may mean a motion candidate derived using bi-directions, and the Zero may mean a zero vector.

Figure 15:
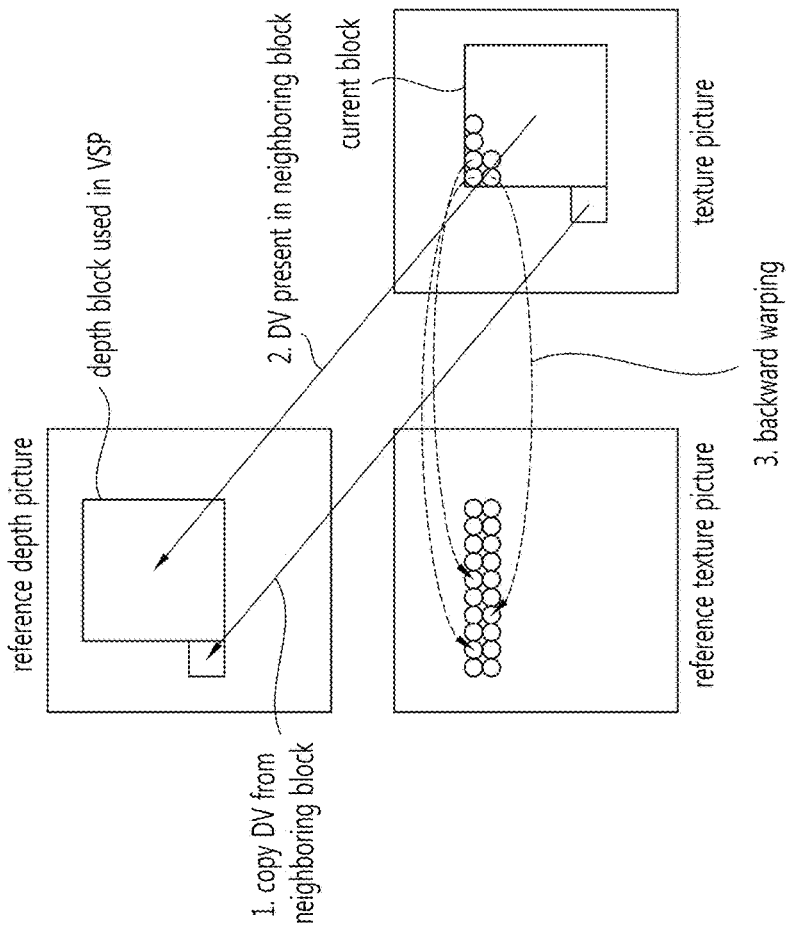
FIG. 15 schematically illustrates the concept of view synthesis prediction (VSP).

FIG. 15 schematically illustrates the concept of view synthesis prediction (VSP).

As shown in FIG. 15, the view synthesis prediction may use a texture picture, a reference texture picture, and a reference depth picture, and the texture picture may include the current block and a neighboring block. Further, the reference depth picture may include the depth block used for the VSP and a block adjacent to the depth block used for the VSP.

The texture picture is a picture where a merge candidate is derived, and the texture picture may mean a true image. The current block means a block that is present in the texture picture and where prediction is performed. The current block may mean a coding unit, or from a point of view that prediction is performed in the current block, may also mean a prediction unit or the above-described sub prediction unit. The 'texture picture' may mean a 'texture slice,' a 'texture view,' a 'texture image,' and/or an 'actual picture,' and for ease of description, the 'texture picture' may also be denoted the 'texture slice,' 'texture view,' 'texture image,' and/or 'actual picture.'

The reference texture picture means a texture picture at a view different from the texture picture, and there may be a plurality of reference texture pictures for the texture picture. In principle, the reference texture picture means a texture picture at a view different from the texture picture, but the present disclosure does not exclude the case where the reference texture picture has the same view as the texture picture. Further, the 'reference texture picture' may mean a 'reference texture slice,' a 'reference texture view,' a 'reference texture image,' and/or a 'reference actual picture,' and for ease of description, the 'reference texture picture' may also be denoted the 'reference texture slice,' 'reference texture view,' 'reference texture image,' and/or 'reference actual picture.'

The reference depth picture means a depth information map present in a view different from the above-described texture picture, and the depth information map may be obtained through the above-described process. In principle, the reference depth picture means a depth picture in a view different from the texture picture, but the present disclosure does not exclude the case where the reference depth picture has the same view as the texture picture. Further, the 'reference depth picture' may mean a 'reference depth slice,' a 'reference depth view,' a 'reference depth image,' and/or a 'reference depth picture,' and for ease of description, the 'reference depth picture' may also be denoted the 'reference depth slice,' 'reference depth view,' 'reference depth image,' and/or 'reference depth picture.'

The VSP is generated using a disparity vector (DV), a referenced depth information map, and normal image information in a corresponding view.

A method for generating the VSP is described in greater detail with reference to FIG. 15. 1) The 3D image encoding/decoding apparatus derives a DV present in a neighboring block of the current block. Thereafter, the 3D image encoding/decoding apparatus 2) copies the DV from the neighboring block and 3) generates a newly generated virtual block through backward warping using the reference texture picture. Then, the current block uses the newly generated virtual block as VSP prediction information, i.e., a VSP merge candidate.

Figure 16:
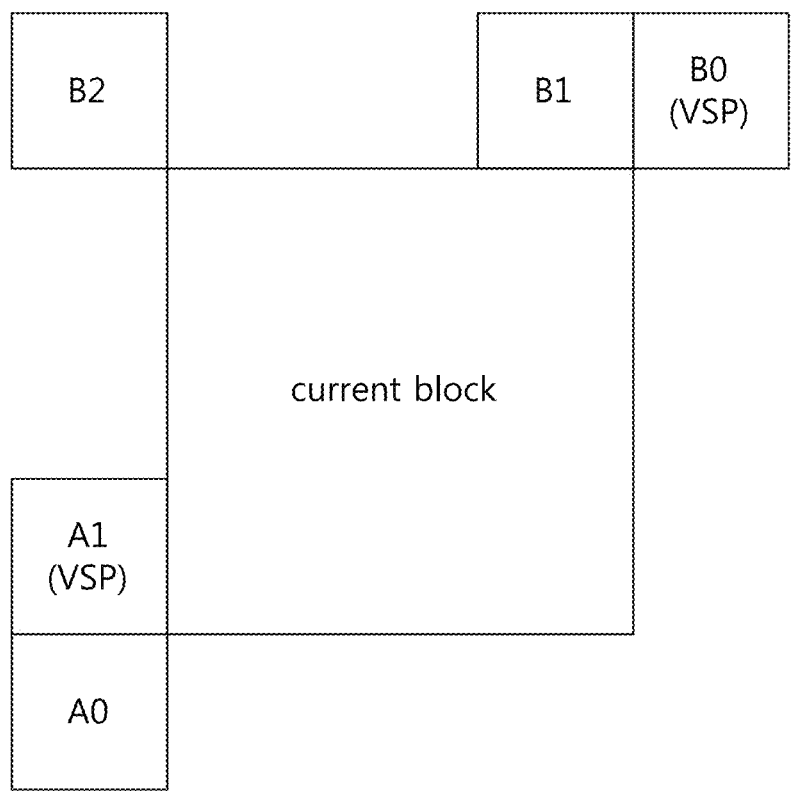
FIG. 16 illustrates an example of a neighbor block inherited as a VSP candidate in 3D image encoding/decoding.

FIG. 16 illustrates an example of a neighbor block inherited as a VSP candidate in 3D image encoding/decoding.

In case inter prediction is performed in 3D image encoding/decoding, there may be spatially neighboring blocks A0, A1, B0, B1, and B2 of the current block, and the current block may mean a prediction block and/or sub prediction unit, and the current block may be shaped as a square or not. Each neighboring block may be a prediction block or sub prediction block, and the neighboring blocks may mean restored blocks. Further, each neighboring block may be the same or different in size from the current block. Each neighboring block having a different size from the current block may mean that each neighboring block has a size smaller or larger than the current block. Each neighboring block may be shaped as a square or not.

In this case, a spatially neighboring block using the VSP may be among the neighboring blocks of the current block. For example, as shown in FIG. 16, among the neighboring blocks of the current block, i.e., the adjacent blocks, A1 and B0 may use the VSP.

In case the spatially neighboring blocks (e.g., A0, A1, B0, B1, and B2) use the VSP, the spatially neighboring blocks using the VSP may be said to be inherited through the VSP and may be denoted inherited VSP candidates. In this case, the inherited VSP candidates use the same disparity vector as the VSP candidates of the current block.

Figure 17:
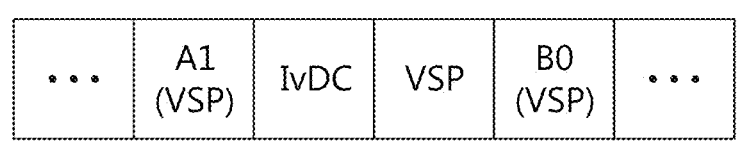

FIG. 17 illustrates an example of a merge candidate list in 3D image encoding/decoding.

FIG. 17 schematically illustrates an example of a method for generating a merge candidate list in case among the neighboring blocks of the current block, A1 and B0 use VSP candidates, i.e., in case A1 and B0 are inherited VSP candidates, like that shown in FIG. 16. Although an example in which A1 and B0 are inherited VSP candidates has been described in connection with FIG. 17, each of the spatially neighboring blocks A0, A1, B0, B1, and B2 may have an inherited VSP candidate. In other words, the blocks respectively located at the left and lower side A0, left side A1, upper side B1, right and upper side B0 and/or left and upper side B2 may be inherited as VSP candidates, and in this case, each neighboring block may be inherited as a VSP candidate regardless of whether other neighboring blocks are inherited VSP candidates.

As in the examples shown in FIGS. 16 and 17, in case A1 and B0 are inherited VSP candidates, A1, IvDC, VSP, and B0 are inserted into the merge candidate list. In this case, if A1 and B0 are inherited VSP candidates, the same disparity vector happens to be inserted redundantly into the merge candidate list. Redundant insertion of the same disparity vector into the merge candidate list, i.e., insertion of multiple same candidates into the list, does not provide any benefit in light of coding efficiency and rather may restrict the possibility of insertion of other merge candidates that may have better efficiency.

Accordingly, there is a need for enhancing coding efficiency by preventing redundant insertion of multiple same merge candidates into the merge candidate list. Required are an apparatus and method for inserting merge candidates other than the merge candidates already inserted into the merge candidate list rather than inserting multiple same merge candidates into the merge candidate list redundantly.

Hereinafter, an apparatus and method for restricting insertion of a VSP candidate in 3D image encoding/decoding are proposed. The present apparatus and method may allow for more efficient utilization of VSP candidates in the merge candidate list and increased possibility of utilization of other candidates. Further, by the apparatus and method, only one VSP candidate may be used in configuring a merge list. Further, redundancy that may occur between VSP candidates in 3D image encoding/decoding may be eliminated, and other candidates may be inserted into the merge list, increasing encoding/decoding efficiency.

Figure 18:
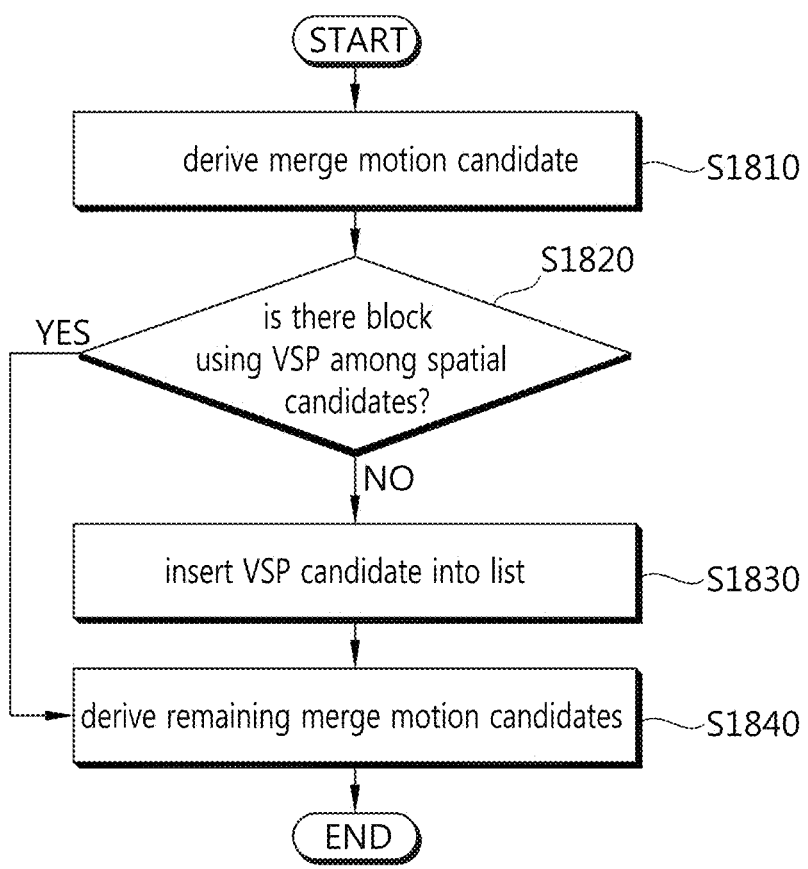
FIG. 18 is a flowchart illustrating a method for restricting addition of a VSP candidate to a merge candidate list depending on whether there is an inherited VSP candidate according to an embodiment of the present invention.

FIG. 18 is a flowchart illustrating a method for restricting addition of a VSP candidate to a merge candidate list depending on whether there is an inherited VSP candidate according to an embodiment of the present invention.

Referring to FIG. 18, the 3D image encoding/decoding apparatus derives merge motion candidates, i.e., merge candidates (S1810). The derived merge candidates may include A0, A1, B0, B1, B2, Col (H or M), a motion parameter inheritance (MPI) candidate, an inter-view merge candidate (IvMC), an inter-view disparity vector candidate (IvDC), a view synthesis prediction (VSP) candidate, a shift inter-view (ShiftIV) candidate, a Bi candidate, and/or a Zero candidate, a detailed description of which has been given above.

In step S1810, the 3D image encoding/decoding apparatus may insert the derived merge candidates into the merge candidate list. For example, the merge candidates derived in step S1810 may mean A1 and/or B1. The 3D image encoding/decoding apparatus may insert A1 and/or B1 into the merge candidate list.

The 3D image encoding/decoding apparatus determines whether there is a block using the VSP among the spatial candidates (S1820). The spatial candidate may mean a spatially neighboring block that may include A0, A1, B0, B1, B2, and/or Col (H or M) as described above. For example, the spatial candidate block determined in step S1820 may be A1 and/or B1. Further, the block using the VSP among the spatial candidates may mean an inherited VSP candidate a detailed description of which has been given above.

In case there is no block using the VSP among the spatial candidates, the 3D image encoding/decoding apparatus inserts the VSP candidate into the merge candidate list (S1830). In this case, the VSP candidate inserted into the merge candidate list means a VSP candidate of the current block a detailed description of which has been given above.

After inserting the VSP candidate into the merge candidate list, the 3D image encoding/decoding apparatus derives the remaining merge motion candidates (S1840). In this case, the remaining merge motion candidates may include A0, A1, B0, B1, B2, Col (H or M), a motion parameter inheritance (MPI) candidate, an inter-view merge candidate (IvMC), an inter-view disparity vector candidate (IvDC), a view synthesis prediction (VSP) candidate, a shift inter-view (ShiftIV) candidate, a Bi candidate, and/or a Zero candidate. In case there is a candidate inserted in the merge candidate list in steps S1810 to S1830, the remaining merge motion candidates may mean candidates except for the candidate inserted into the merge list among A0, A1, B0, B1, B2, Col (H or M), a motion parameter inheritance (MPI) candidate, an inter-view merge candidate (IvMC), an inter-view disparity vector candidate (IvDC), a view synthesis prediction (VSP) candidate, a shift inter-view (ShiftIV) candidate, a Bi candidate, and/or a Zero candidate.

For example, in case A1, B1, and the VSP candidate are inserted into the merge candidate list in steps S1810 to S1830, the 3D image encoding/decoding apparatus may derive as to whether to insert the remaining merge candidates except A1, B1, and the VSP candidate into the merge candidate list in step S1840.

In case there is a block using the VSP, i.e., an inherited VSP candidate, among the spatial candidates in step S1820, the 3D image encoding/decoding apparatus derives the remaining merge motion candidates without inserting the VSP candidate into the merge candidate list (S1840). A detailed description of deriving the remaining merge motion candidates by the 3D image encoding/decoding apparatus has been given above.

Figure 19:
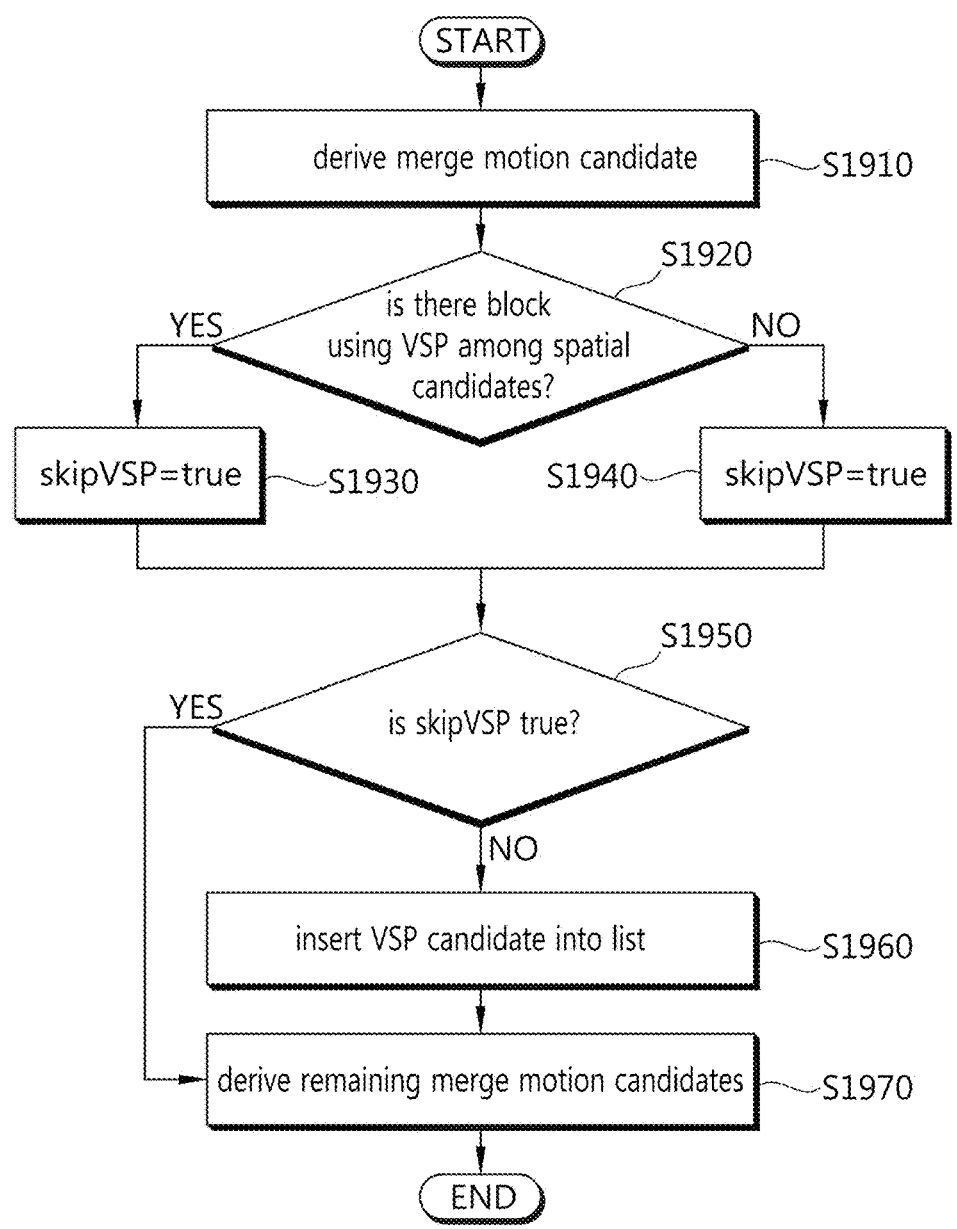
FIG. 19 is a flowchart illustrating a method for restricting addition of a VSP candidate to a merge candidate list depending on whether there is an inherited VSP candidate, which is implemented in 3D HEVC, according to another embodiment of the present invention.

FIG. 19 is a flowchart illustrating a method for restricting addition of a VSP candidate to a merge candidate list depending on whether there is an inherited VSP candidate, which is implemented in 3D HEVC, according to another embodiment of the present invention.

Referring to FIG. 19, the 3D image encoding/decoding apparatus derives merge motion candidates, i.e., merge candidates (S1910). A detailed description of deriving the merge candidates by the 3D image encoding/decoding apparatus has been given above.

The 3D image encoding/decoding apparatus determines whether there is a block using the VSP among the spatial candidates (S1920). A detailed description of determining whether there is a block using the VSP among the spatial candidates by the 3D image encoding/decoding apparatus has been given above.

In case there is a neighboring block using the VSP among the spatial candidates, the 3D image encoding/decoding apparatus sets skipVSP as true (S1930). In this case, skipVSP means information for determining whether to insert the VSP candidate into the merge candidate list. If skipVSP is true, the VSP candidate is not inserted into the merge candidate list. Further, in case skipVSP is false, the VSP candidate is inserted into the merge candidate list.

In case there is no neighboring block using the VSP among the spatial candidates, the 3D image encoding/decoding apparatus sets skipVSP as false (S1940).

Thereafter, the 3D image encoding/decoding apparatus determines whether skipVSP is true (S1950).

Unless skipVSP is true, i.e., when skipVSP is false, the 3D image encoding/decoding apparatus inserts the VSP candidate into the merge candidate list (S1960). A detailed description of inserting the VSP candidate into the merge candidate list by the 3D image encoding/decoding apparatus has been given above.

Thereafter, the 3D image encoding/decoding apparatus derives the remaining merge motion candidates (S1970). A detailed description of deriving the remaining merge motion candidates by the 3D image encoding/decoding apparatus has been given above.

In case skipVSP is true in step S1950, the 3D image encoding/decoding apparatus derives the remaining merge motion candidates without inserting the VSP candidate into the merge candidate list (S1970). A detailed description of deriving the remaining merge motion candidates without inserting the VSP candidate into the merge candidate list by the 3D image encoding/decoding apparatus when skipVSP is true has been given above.

In the above-described method, if there is an inherited VSP, the 3D image encoding/decoding apparatus might not add the VSP candidate to the merge candidate list. That is, through the above-described method, the 3D image encoding/decoding apparatus, in case there is an inherited VSP among the neighboring blocks, i.e., adjacent blocks, abstains from adding the VSP candidate for the current block to the merge candidate list to thereby reduce redundancy of the merge candidates present in the merge candidate list and to thereby enable insertion of additional merge candidates other than the VSP candidate into the merge candidate list, thus enhancing coding efficiency.

An apparatus for restricting addition of the VSP candidate to the merge candidate list depending on whether there is an inherited VSP candidate may be configured to add a module for eliminating redundancy of the VSP to an existing inter prediction module. An apparatus for restricting addition of a VSP candidate to a merge candidate list depending on whether there is an inherited VSP candidate according to an embodiment of the present invention is detailed in further detail with reference to FIG. 20.

Figure 20:
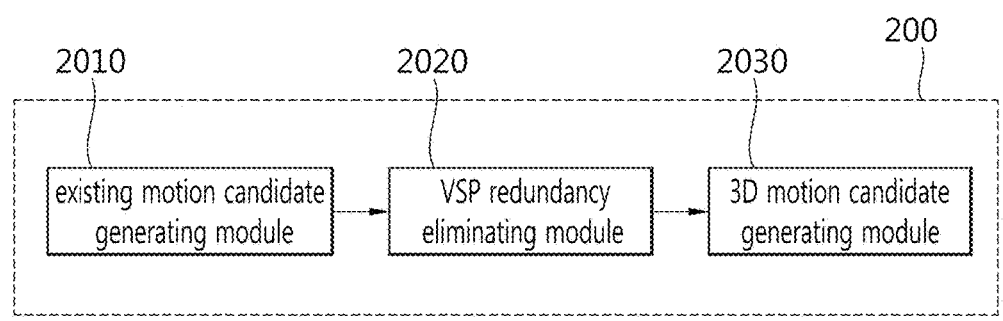
FIG. 20 is a block diagram illustrating an apparatus for restricting addition of a VSP candidate to a merge candidate list depending on whether there is an inherited VSP candidate according to an embodiment of the present invention.

FIG. 20 is a block diagram illustrating an apparatus for restricting addition of a VSP candidate to a merge candidate list depending on whether there is an inherited VSP candidate according to an embodiment of the present invention.

Referring to FIG. 20, the inter prediction module 2000 may include an existing motion candidate generating module, a VSP redundancy eliminating module, and a 3D motion candidate generating module.

The existing motion candidate generating module derives merge motion candidates, i.e., merge candidates. The derived merge candidates have been described above, a detailed description thereof has been given above. Further, the existing motion candidate generating module may insert the derived merge candidates into a merge candidate list. For example, the derived merge candidates may mean A1 and/or B1. The 3D image encoding/decoding apparatus may insert A1 and/or B1 into the merge candidate list.

In this case, the 'existing motion candidate generating module' may mean a 'spatial merge candidate inserting module,' and for ease of description, the 'existing motion candidate generating module' may be interchangeably used with the 'spatial merge candidate inserting module' hereinafter.

The VSP redundancy eliminating module may determine whether there is a block using the VSP among the spatial candidates. The spatial candidate may mean a spatially neighboring block that may include A0, A1, B0, B1, B2, and/or Col (H or M) as described above. For example, the spatial candidate block determined by the VSP redundancy eliminating module may be A1 and/or B1. The block using the VSP among the spatial candidates may mean an inherited VSP candidate a detailed description of which has been given above.

Further, in 3D image encoding/decoding, the VSP redundancy eliminating module may set skipVSP as true or false based on the result of the determination. In this case, a detailed description of setting skipVSP as true or false based on the result of the determination by the VSP redundancy eliminating module has been given above.

In this case, the 'VSP redundancy eliminating module' may mean a 'VSP redundancy determining module' and for ease of description, the 'VSP redundancy eliminating module' may be interchangeably used with the 'VSP redundancy determining module' hereinafter.

The 3D motion candidate generating module, after inserting the VSP candidate into the merge candidate list, derives the remaining merge motion candidates. A detailed description of deriving the remaining merge motion candidates by the 3D motion candidate generating module has been given above. A detailed description of the remaining merge motion candidates has been given above.

For example, in case A1, B1, and the VSP candidate are inserted into the merge candidate list in the existing motion candidate generating module and the VSP redundancy eliminating module, the 3D motion candidate generating module may derive as to whether the 3D image encoding/decoding apparatus is to insert the remaining merge candidates except A1, B1, and VSP candidate into the merge candidate list.

In case there is a block using the VSP, i.e., an inherited VSP candidate, among the spatial candidates and thus the VSP redundancy eliminating module determines that there is the inherited VSP candidate, the 3D motion candidate generating module derives the remaining merge motion candidates without inserting the VSP candidate into the merge candidate list. A detailed description of deriving the remaining merge motion candidates by the 3D image encoding/decoding apparatus has been given above.

In this case, the '3D motion candidate generating module' may mean a '3D merge candidate inserting module' or 'VSP candidate inserting module,' and for ease of description, the '3D motion candidate generating module,' the '3D merge candidate inserting module,' and the 'VSP candidate inserting module' may be interchangeably used hereinafter.

The apparatus for restricting addition of a VSP candidate to a merge candidate list depending on whether there is an inherited VSP candidate may be configured to expand/add the VSP redundancy eliminating module to the 3D motion candidate generating module. In this case, whether the VSP candidate is to be used may be determined depending on whether the spatially neighboring candidate determined by the existing motion candidate generating module uses the VSP, and the determination on whether the VSP candidate is to be used may be performed before the determination as to deriving the VSP candidate. An apparatus for restricting addition of a VSP candidate to a merge candidate list depending on whether there is an inherited VSP candidate according to another embodiment of the present invention is detailed in further detail with reference to FIG. 21.

Figure 21:
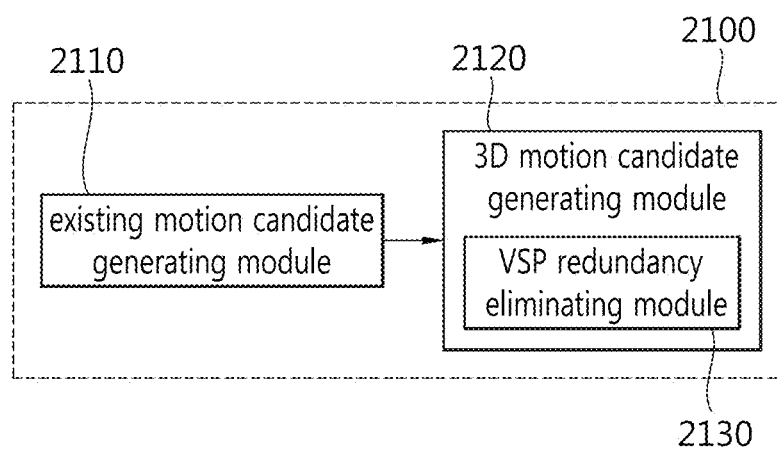
FIG. 21 is a block diagram illustrating an apparatus for restricting addition of a VSP candidate to a merge candidate list depending on whether there is an inherited VSP candidate according to another embodiment of the present invention.

FIG. 21 is a block diagram illustrating an apparatus for restricting addition of a VSP candidate to a merge candidate list depending on whether there is an inherited VSP candidate according to another embodiment of the present invention.

Referring to FIG. 21, the inter prediction module 2100 may include an existing motion candidate generating module and a 3D motion candidate generating module, and the 3D motion candidate generating module may include a VSP redundancy eliminating module.

The existing motion candidate generating module has been described above. A detailed description of the existing motion candidate generating module has been given above.

The 3D motion candidate generating module may include the VSP redundancy eliminating module. Whether the VSP candidate is to be used may be determined depending on whether the spatially neighboring candidate determined by the existing motion candidate generating module uses the VSP, and the determination on whether the VSP candidate is to be used may be performed before the determination as to deriving the VSP candidate. A detailed description of the 3D motion candidate generating module and the VSP redundancy eliminating module has been given above.

When restricting addition of the VSP candidate to the merge candidate list depending on whether there is an inherited VSP candidate, the 3D image encoding/decoding apparatus may reference two directions or only one direction among the spatial merge candidates, and the 3D image encoding/decoding apparatus may reduce the number of times of referencing the flag for determining whether to use the VSP by referencing two directions or only one direction among the spatial merge candidates. In this case, the reduction in the number of times of referencing the flag for determining whether to use the VSP may decrease the number of times of accessing the memory by the 3D image encoding/decoding apparatus. Hereinafter, the above method is described in further detail.

Figure 22:
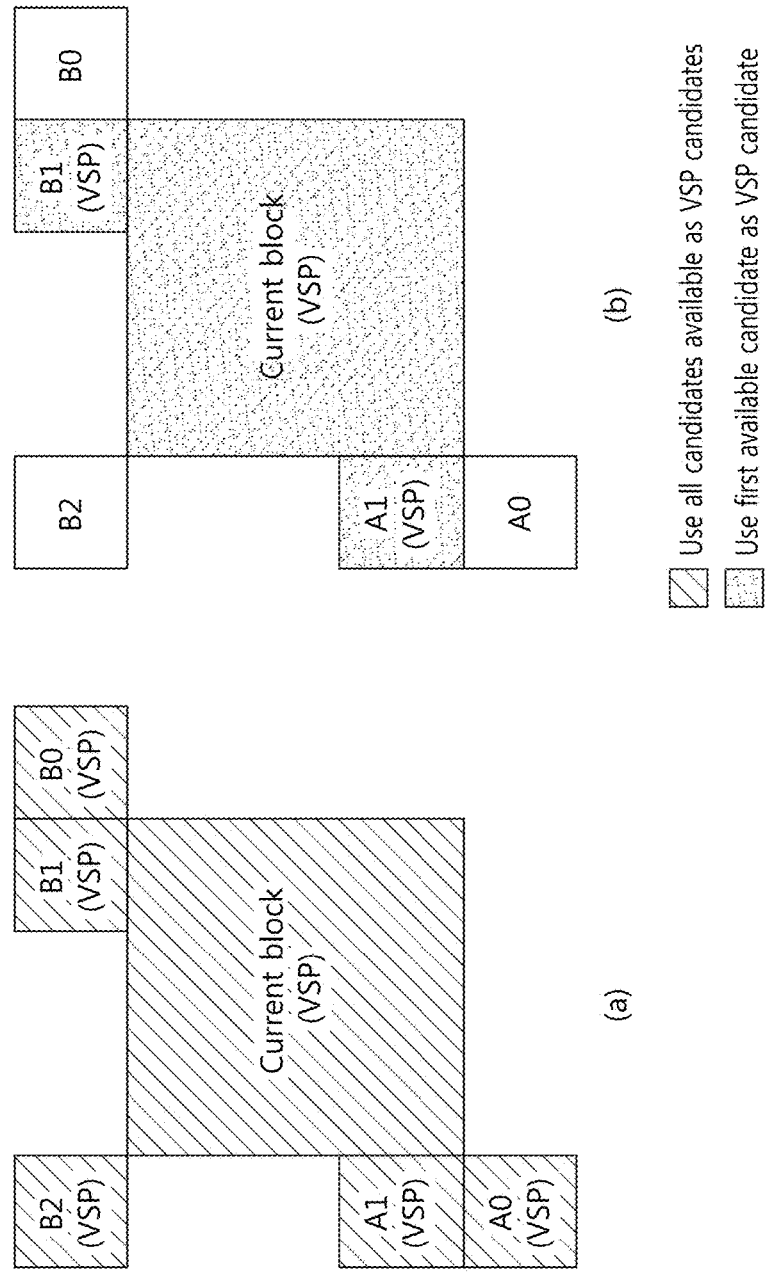
FIG. 22 is a view illustrating comparison between an existing merge candidate deriving method and a merge candidate deriving method according to another embodiment of the present invention.

FIG. 22 is a view illustrating comparison between an existing merge candidate deriving method and a merge candidate deriving method according to another embodiment of the present invention.

FIG. 22(*a*) shows an example of deriving an existing merge candidate. Referring to FIG. 22(*a*), each of the spatial adjacent blocks A0, A1, B0, B1, and/or B2 in deriving the existing merge candidates may be a VSP coded/decoded in a VSP mode, i.e., an inherited VSP. The 3D encoding/decoding apparatus sometimes inserts the VSP candidate to the merge candidate list of the current block regardless of whether the spatial adjacent blocks have been coded/decoded in the VSP mode when configuring the merge candidate list of the current block, which is mere insertion of redundant motion information into the merge candidate list, thus resulting in a deterioration of image encoding/decoding efficiency.

FIG. 22(b) shows an example of deriving a merge candidate according to another embodiment of the present invention. Referring to FIG. 22(b), the 3D image encoding/decoding apparatus determines whether A1 and/or B1 among neighboring blocks have used the VSP, i.e., whether it is an inherent VSP, when configuring the merge candidate list for the current block. Thereafter, the 3D image encoding/decoding apparatus, when A1 and/or B1 among the neighboring blocks have used the VSP, restricts insertion of the VSP candidate into the merge list.

A method for restricting addition of a VSP candidate to a merge candidate list by referencing two directions among the spatial merge candidates in 3D image encoding/decoding is described in greater detail.

Figure 23:
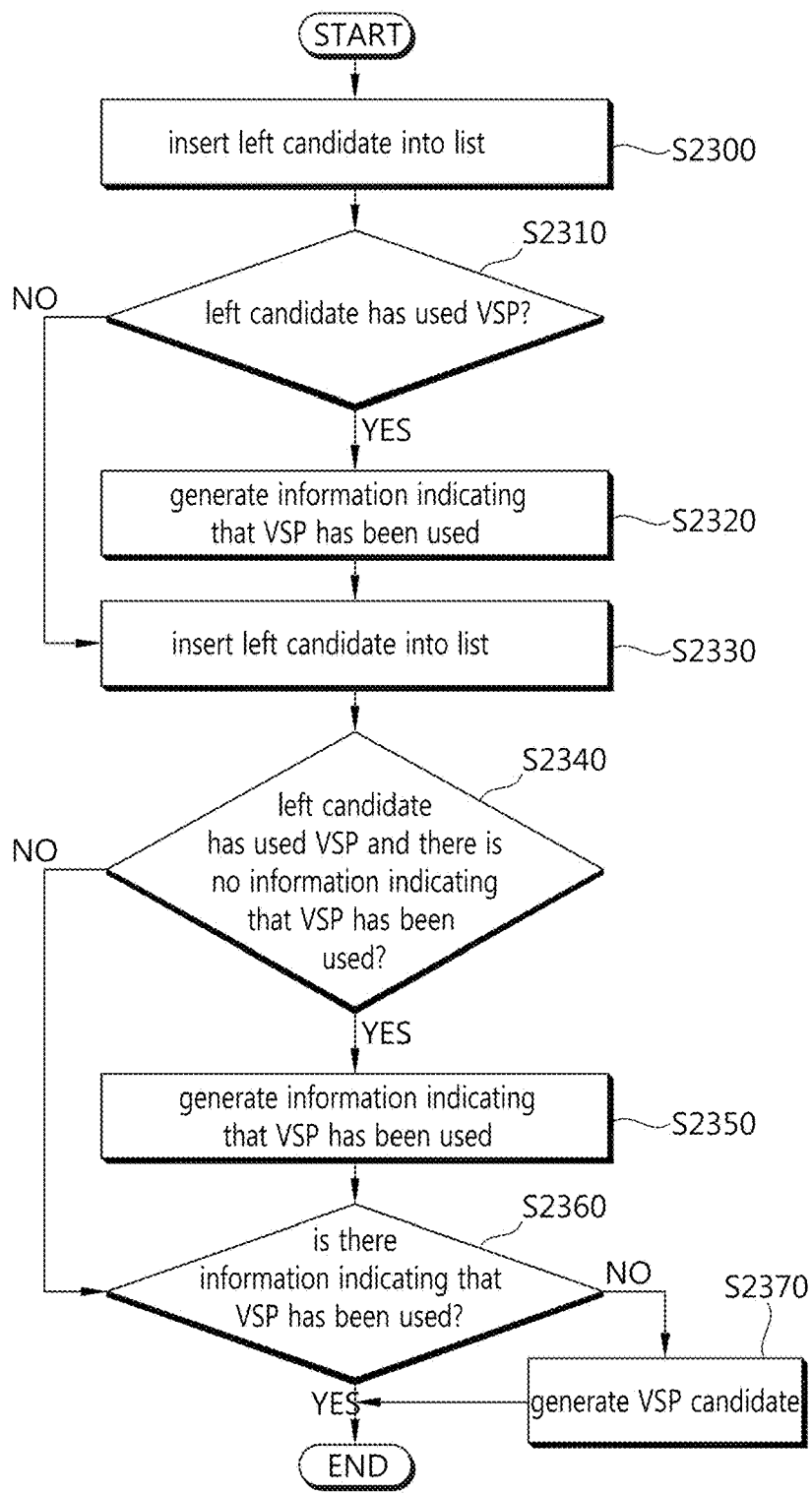
FIG. 23 is a flowchart illustrating a method for restricting addition of a VSP candidate to a merge candidate list by referencing two directions among spatial merge candidates according to another embodiment of the present invention.

FIG. 23 is a flowchart illustrating a method for restricting addition of a VSP candidate to a merge candidate list by referencing two directions among spatial merge candidates according to another embodiment of the present invention.

Referring to FIG. 23, the 3D image encoding/decoding apparatus inserts a candidate positioned at a left side of the current block, i.e., a candidate positioned left, into the list (S2300). Although it has been described that the 3D image encoding/decoding apparatus inserts the candidate positioned at the left side of the current block into the list, the candidate positioned at the left side of the current block is merely an example. The candidate inserted into the list by the 3D image encoding/decoding apparatus in step S2300 may be any one of the spatial candidates (e.g., candidates positioned at the left, left and lower, left and upper, upper, and right and upper sides of the current block). In this case, the candidate positioned at the left side of the current block may be A1, the candidate positioned at the left and lower side may be A0, and the candidate positioned at the left and upper side may be B2. Further, the candidate positioned at the upper side of the current block may be B1, and the candidate positioned at the right and upper side may be B0.

The 3D image encoding/decoding apparatus determines whether the left candidate has used the VSP, i.e., whether the left candidate is an inherited VSP, (S2310). A detailed description of determining whether the left candidate has used the VSP has been given above.

In case the left candidate has used the VSP, the 3D image encoding/decoding apparatus generates information indicating that the VSP has been used (S2320). A detailed description of the information indicating that the VSP has been used has been given above.

Thereafter, the 3D image encoding/decoding apparatus inserts the candidate positioned at the upper side of the current block into the merge list (S2330). Although it has been described that the 3D image encoding/decoding apparatus inserts the candidate positioned at the upper side of the current block into the list, the candidate positioned at the upper side of the current block is merely an example. The candidate inserted into the list by the 3D image encoding/decoding apparatus in step S2330 may be any one of the spatial candidates (e.g., candidates positioned at the left, left and lower, left and upper, upper, and right and upper sides of the current block).

In case the left candidate has not used the VSP in step S2310, the 3D image encoding/decoding apparatus inserts the upper candidate into the list without generating information indicating that the VSP has been used (S2330).

After inserting the upper candidate into the merge list in step S2330, the 3D image coding/decoding apparatus determines whether there is information indicating that the upper candidate has used the VSP and that the VSP has been used (S2340).

In case there is no information indicating that the upper candidate has used the VSP and the VSP has been used, the 3D image encoding/decoding apparatus generates information indicating that the VSP has been used (S2350). In this case, the information indicating that the VSP has been used in step S2350 is generated only when there is no information indicating that the VSP has been used while the VSP is used at the same time.

Thereafter, the 3D image encoding/decoding apparatus determines whether there is information indicating that the VSP has been used (S2360). A detailed description of determining whether there is information indicating that the VSP has been used has been given above.

Here, in case there is information indicating that the VSP has been used, the 3D image encoding/decoding apparatus abstains from inserting the VSP candidate into the merge candidate list.

In case there is no information indicating that the VSP has been used in step S2360, the 3D image encoding/decoding apparatus generates the VSP candidate in the merge candidate list, i.e., inserts the VSP candidate into the merge candidate list (S2370).

The above-described method may apply to each spatial adjacent candidate. If VSP inheritance has been performed in a previous spatial candidate, the current spatial candidate may be used as a candidate performing prediction using only the DV.

Further, the above-described method may be implemented in the above-described 3D image encoding/decoding apparatus.

Figure 24A:
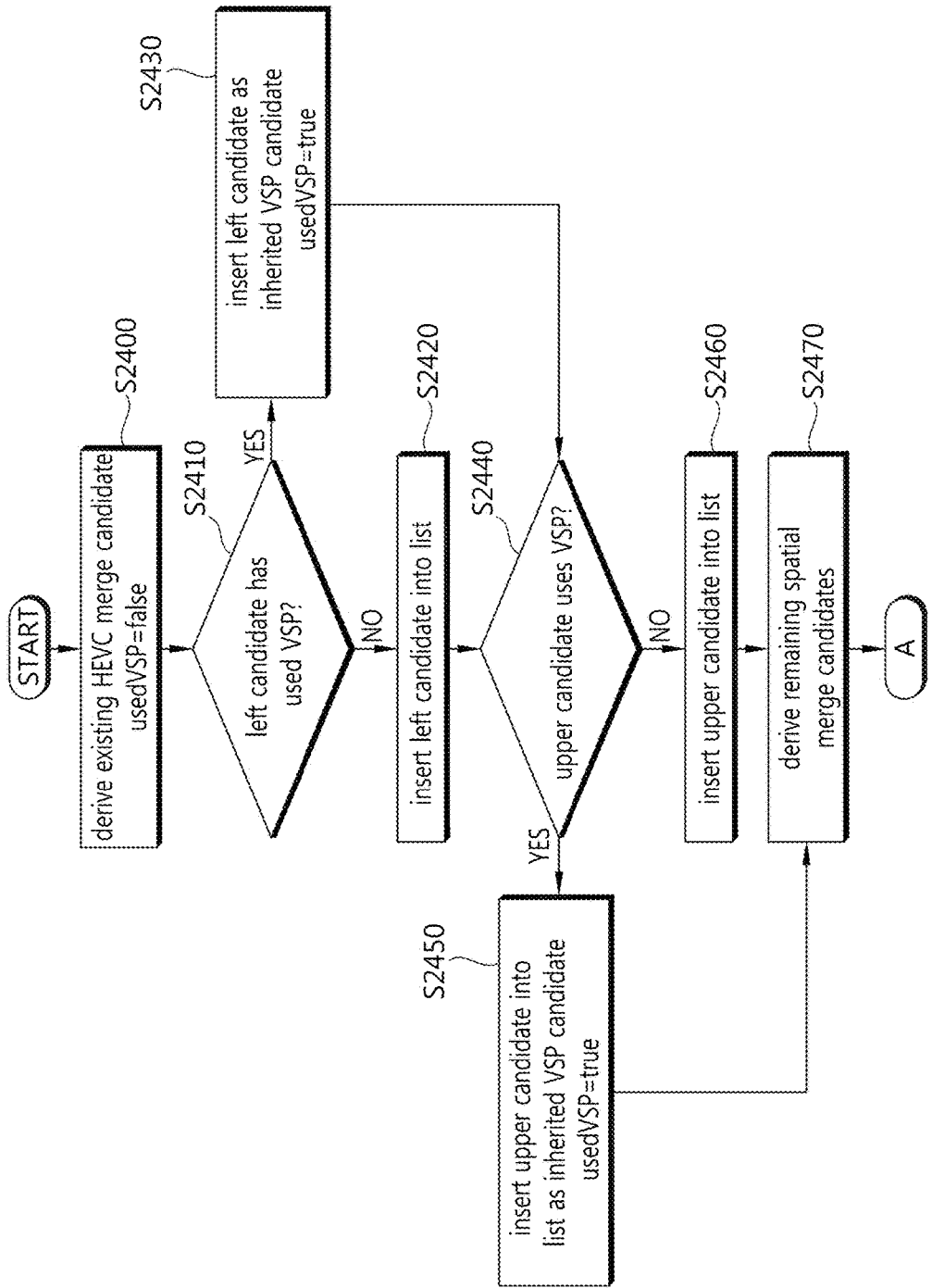
FIGS. 24a and 24b are flowcharts illustrating an example of applying, to 3D HEVC, a method for restricting addition of a VSP candidate to a merge candidate list by referencing two directions among spatial merge candidates according to another embodiment of the present invention.
Figure 24B:
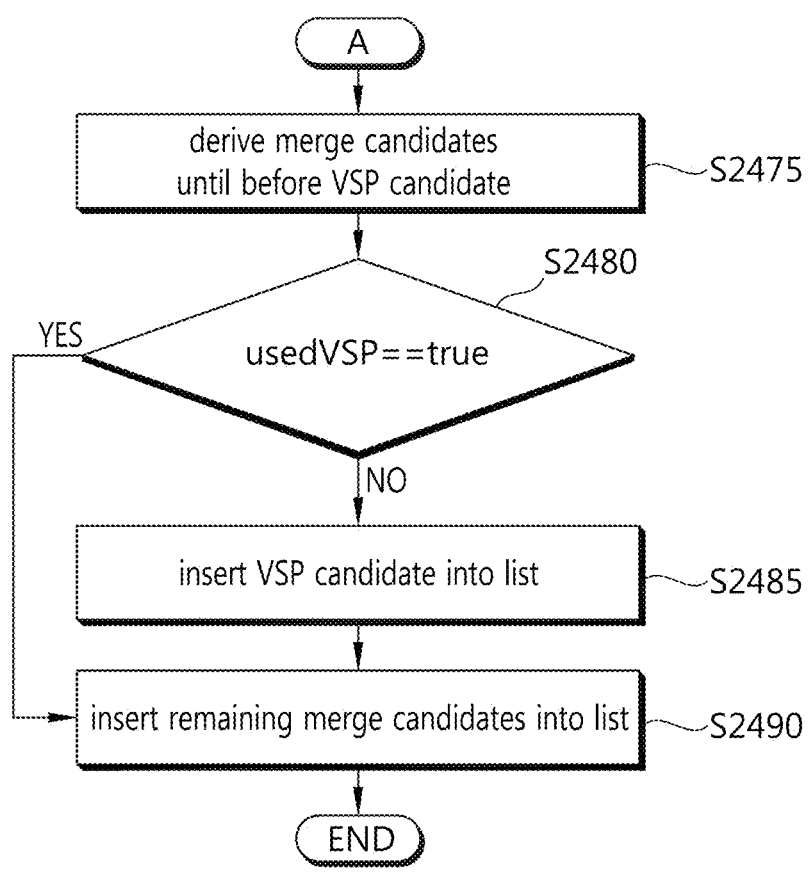

FIGS. 24a and 24b are flowcharts illustrating an example of applying, to 3D HEVC, a method for restricting addition of a VSP candidate to a merge candidate list by referencing two directions among spatial merge candidates according to another embodiment of the present invention.

Referring to FIGS. 24a and 24b, the 3D image encoding/decoding apparatus derives an existing HEVC merge candidate and sets usedVSP as false (S2400). A detailed description of deriving the existing HEVC merge candidate and setting usedVSP as false has been given above.

The 3D image encoding/decoding apparatus determines whether a left candidate uses the VSP (S2410). A detailed description of determining whether the left candidate uses the VSP by the 3D image encoding/decoding apparatus has been given above.

In case the left candidate uses the VSP, the 3D image encoding/decoding apparatus inserts the left candidate into the list as an inherited VSP and sets usedVSP as true (S2430). In this case, a detailed description of inserting the left candidate into the list as the inherited VSP and setting usedVSP as true has been given above.

In case the left candidate does not use the VSP, the 3D image encoding/decoding apparatus inserts the left candidate into the merge candidate list (S2420). A detailed description of inserting the left candidate into the merge candidate list by the 3D image encoding/decoding apparatus has been given above.

After step S2420 or S2430, the 3D image encoding/decoding apparatus determines whether an upper candidate uses the VSP and usedVSP is false (S2440). A detailed description of determining whether the upper candidate uses the VSP and whether usedVSP is false by the 3D image encoding/decoding apparatus has been given above.

In case the upper candidate uses the VSP and usedVSP is false, the 3D image encoding/decoding apparatus inserts the upper candidate into the list as an inherited VSP candidate and sets usedVSP as true.

In case the upper candidate uses the VSP and usedVSP is not false, the 3D image encoding/decoding apparatus inserts the upper candidate into the merge list (S2460). A detailed description of inserting the upper candidate into the merge candidate list by the 3D image encoding/decoding apparatus has been given above.

After step S2450 or S2460, the 3D image encoding/decoding apparatus derives the remaining spatial merge candidates (S2470). A detailed description of deriving the remaining spatial merge candidates by the 3D image encoding/decoding apparatus has been given above.

The 3D image encoding/decoding apparatus derives merge candidates until before the VSP candidate (S2475). The merge candidates until before the VSP candidate after step S2470 may include A0, A1, B0, B1, B2, Col (H or M), a motion parameter inheritance (MPI) candidate, an inter-view merge candidate (IvMC), an inter-view disparity vector candidate (IvDC), a view synthesis prediction (VSP) candidate, a shift inter-view (ShiftIV) candidate, a Bi candidate, and/or a Zero candidate. There may be no merge candidates until before the VSP candidate after step S2470.

The 3D image encoding/decoding apparatus determines whether usedVSP is true (S2480). A detailed description of determining whether usedVSP is true by the 3D image encoding/decoding apparatus has been given above.

In case usedVSP is not true, i.e., if usedVSP is false, the 3D image encoding/decoding apparatus inserts the VSP candidate into the merge list (S2485). A detailed description of inserting the VSP candidate into the merge list by the 3D image encoding/decoding apparatus and a detailed description of the VSP candidate have been given above.

Thereafter, the 3D image encoding/decoding apparatus inserts the remaining merge candidates into the list (S2490). In this case, a detailed description of inserting the remaining merge candidates into the list has been given above.

In case usedVSP is true, the 3D image encoding/decoding apparatus inserts the remaining merge candidates into the list without inserting the VSP candidate into the list (S2490). In this case, a detailed description of inserting the remaining merge candidates into the list without inserting the VSP candidate into the list has been given above.

Figure 25:
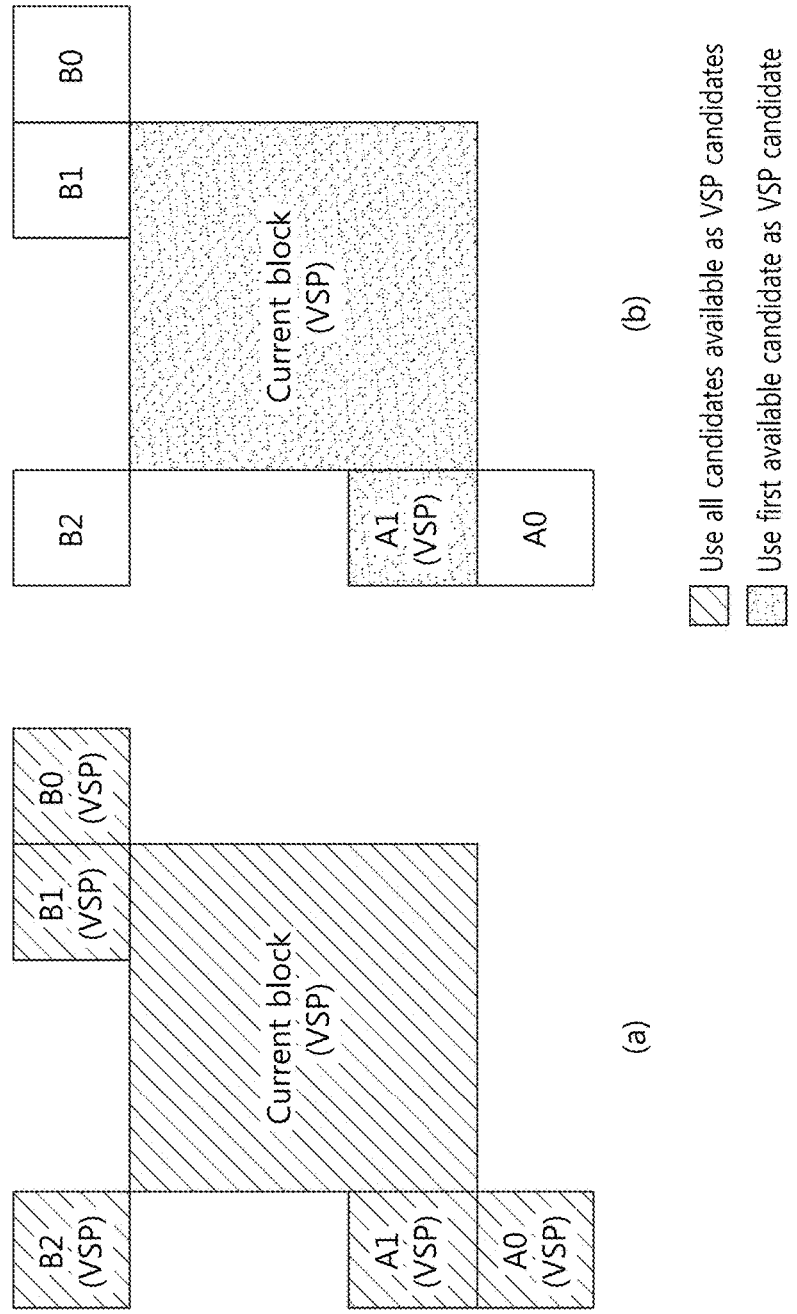
FIG. 25 is a view illustrating comparison between an existing merge candidate deriving method and a merge candidate deriving method according to another embodiment of the present invention.

FIG. 25 is a view illustrating comparison between an existing merge candidate deriving method and a merge candidate deriving method according to another embodiment of the present invention.

FIG. 25(*a*) shows an example of deriving an existing merge candidate. In this case, a detailed description of deriving the existing merge candidate has been given above.

FIG. 22(*b*) shows an example of deriving a merge candidate according to another embodiment of the present invention. Referring to FIG. 22(*b*), the 3D image encoding/decoding apparatus determines whether A1 among neighboring blocks has used the VSP, i.e., whether it is an inherent VSP, when configuring the merge candidate list for the current block. Thereafter, the 3D image encoding/decoding apparatus, when A1 among the neighboring blocks has used the VSP, restricts insertion of the VSP candidate into the merge list.

Now described in detail is a method for restricting insertion of a VSP candidate into a merge list by referencing one direction among spatial candidates in 3D image encoding/decoding.

Figure 26:
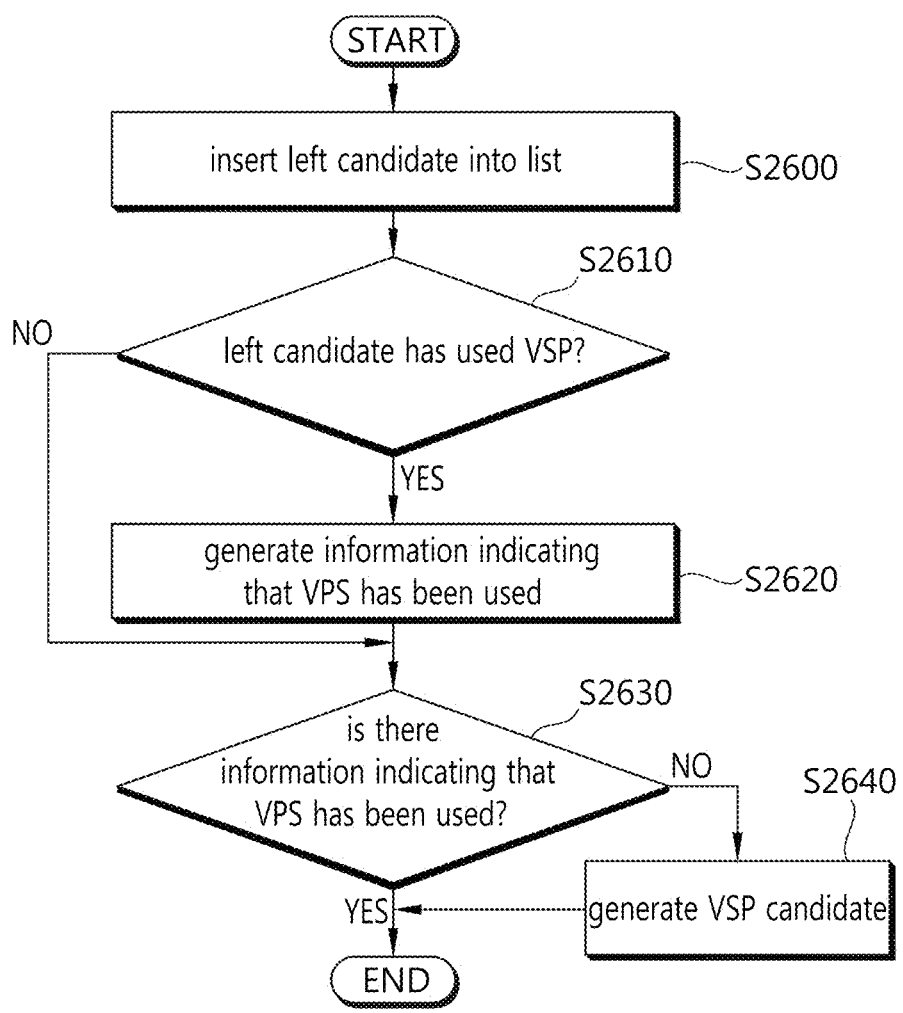
FIG. 26 is a flowchart illustrating a method for restricting addition of a VSP candidate to a merge candidate list by referencing one direction among spatial merge candidates according to another embodiment of the present invention.

FIG. 26 is a flowchart illustrating a method for restricting addition of a VSP candidate to a merge candidate list by referencing one direction among spatial merge candidates according to another embodiment of the present invention.

Referring to FIG. 26, the 3D image encoding/decoding apparatus inserts a candidate positioned at a left side of the current block (A1, referring to FIG. 25(*b*)), i.e., a candidate positioned at the left side, into the merge candidate list (S2600). Although it has been described that the 3D image encoding/decoding apparatus inserts the candidate positioned at the left side of the current block into the merge candidate list, the candidate positioned at the left side of the current block is merely an example. The candidate inserted into the merge candidate list by the 3D image encoding/decoding apparatus in step S2600 may be any one of the spatial candidates (e.g., candidates positioned at the left, left and lower, left and upper, upper, and right and upper sides of the current block).

The 3D image encoding/decoding apparatus determines whether the candidate positioned at the left side of the current block has used the VSP, i.e., whether the candidate is VSP (S2610) at the left side of the current block. A detailed method for determining whether the candidate has used the VSP has been described above.

In case the left candidate has used the VSP, the 3D image encoding/decoding apparatus generates information indicating that the inherited VSP candidate has been used (S2620). A detailed description of the information indicating that the VSP has been used has been given above.

In case the left candidate has not used the VSP, the 3D image encoding/decoding apparatus abstains from generating the information indicating that the inherited VSP candidate has been used.

Thereafter, the 3D image encoding/decoding apparatus determines whether there is information indicating that the inherited VSP candidate has been used (S2630). A detailed description of determining whether there is information indicating the VSP has been used has been given above.

Here, in case there is information indicating the inherited VSP candidate has been used, the 3D image encoding/decoding apparatus abstains from inserting the VSP candidate of the current block into the merge candidate list.

In case there is no information indicating that the inherited VSP candidate has been used in step S2630, the 3D image encoding/decoding apparatus generates the VSP candidate of the current block, i.e., inserts the VSP candidate of the current block into the merge candidate list (S2640).

The above-described method may apply to each spatial neighboring channel. If VSP inheritance has been performed in a previous spatial candidate, the current spatial candidate may be used as a candidate to be predicted using only the DV. Further, the above-described method may be implemented in the above-described 3D image encoding/decoding apparatus.

Figure 27A:
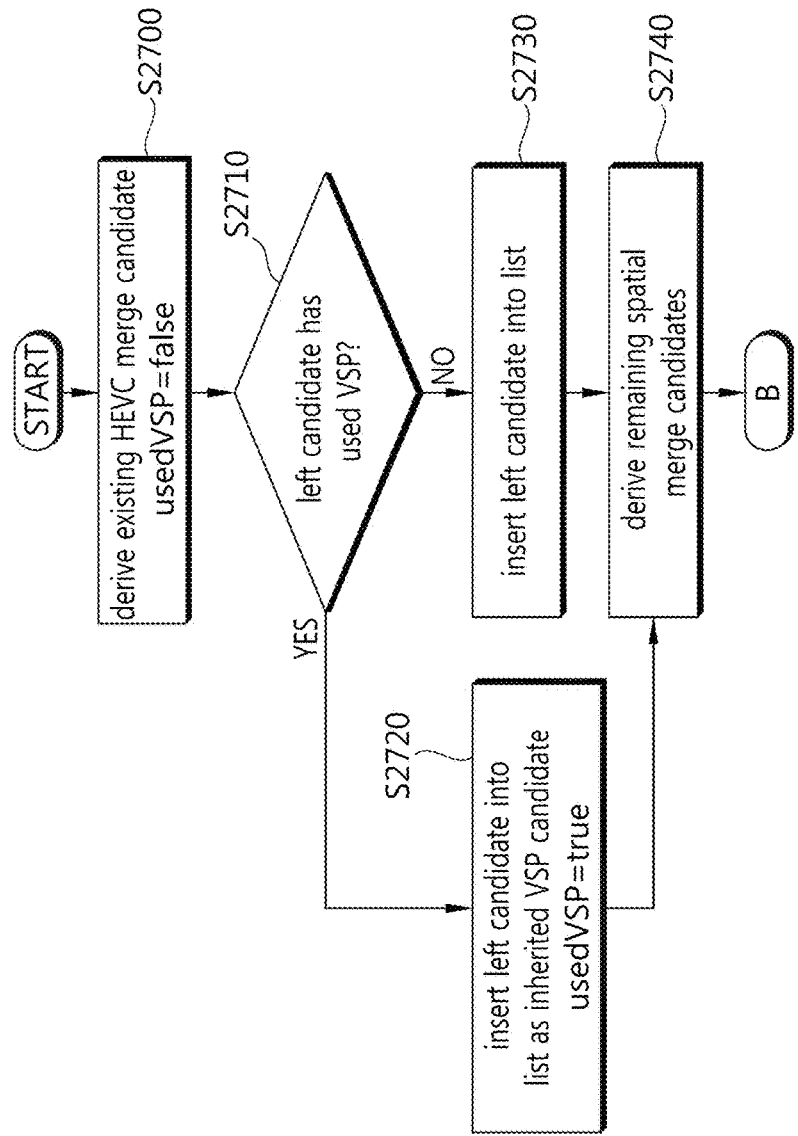
FIGS. 27a and 27b are flowcharts illustrating an example of applying, to 3D HEVC, a method for restricting addition of a VSP candidate to a merge candidate list by referencing one direction among spatial merge candidates according to another embodiment of the present invention.
Figure 27B:
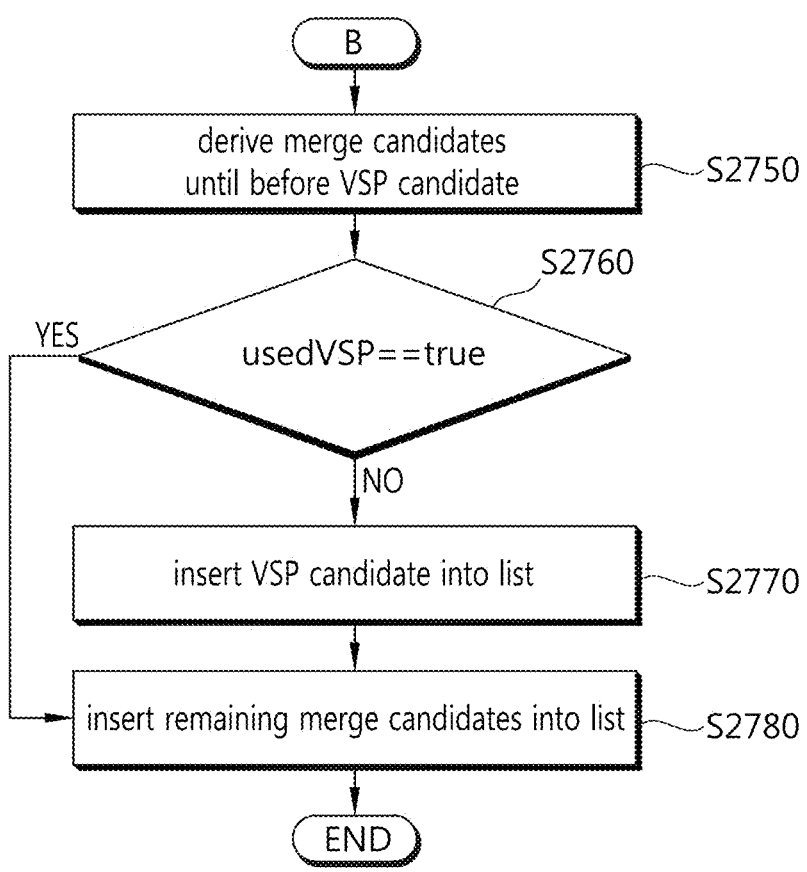

FIGS. 27*a* and 27*b* are flowcharts illustrating an example of applying, to 3D HEVC, a method for restricting addition of a VSP candidate to a merge candidate list by referencing one direction among spatial merge candidates according to another embodiment of the present invention.

Referring to FIGS. 27*a* and 27*b*, the 3D image encoding/decoding apparatus derives an existing HEVC merge candidate and sets usedVSP as false (S2700). A detailed description of deriving the existing HEVC merge candidate and setting usedVSP as false has been given above.

The 3D image encoding/decoding apparatus determines whether a candidate of the left side uses the VSP (S2710). A detailed description of determining whether the left candidate uses the VSP by the 3D image encoding/decoding apparatus has been given above.

In case the candidate of the left side uses the VSP, the 3D image encoding/decoding apparatus inserts the candidate into the merge candidate list as an inherited VSP candidate and sets usedVSP as true (S2720). In this case, a detailed description of inserting the candidate into the merge candidate list as the inherited VSP and setting usedVSP as true has been given above.

In case the candidate of the left side does not use the VSP, the 3D image encoding/decoding apparatus inserts the left candidate into the merge candidate list (S2730). A detailed description of inserting the left candidate into the merge candidate list by the 3D image encoding/decoding apparatus has been given above.

After step S2720 or S2730, the 3D image encoding/decoding apparatus derives the remaining spatial merge candidates (S2740). In this case, a detailed description of deriving the remaining spatial merge candidates by the 3D image encoding/decoding apparatus has been given above.

The 3D image encoding/decoding apparatus derives the merge candidates until before the VSP candidate (S2750). The other merge candidates are placed into merge candidate list until before the VSP candidate after step S2740 For example, the candidates may include A0, A1, B0, B1, B2, Col (H or M), a motion parameter inheritance (MPI) candidate, an inter-view merge candidate (IvMC), an inter-view disparity vector candidate (IvDC), a view synthesis prediction (VSP) candidate, a shift inter-view (ShiftIV) candidate, a Bi candidate, and/or a Zero candidate. There may be no merge candidates until before the VSP candidate after step S2740. It is just example for understanding to the prevention.

The 3D image encoding/decoding apparatus determines whether usedVSP is true (S2760). A detailed description of determining whether usedVSP is true by the 3D image encoding/decoding apparatus has been given above.

In case usedVSP is not true, i.e., if usedVSP is false, the 3D image encoding/decoding apparatus inserts the VSP candidate into the merge candidate list (S2770). A detailed description of inserting the VSP candidate into the merge list by the 3D image encoding/decoding apparatus and a detailed description of the VSP candidate have been given above.

Thereafter, the 3D image encoding/decoding apparatus inserts the remaining merge candidates into the merge candidate list (S2780). In this case, a detailed description of inserting the remaining merge candidates has been given above.

In case usedVSP is true, the 3D image encoding/decoding apparatus inserts the remaining merge candidates without inserting the VSP candidate into the merge candidate list (S2780). In this case, a detailed description of inserting the remaining merge candidates into the list without inserting the VSP candidate into the list has been given above.

Figure 28:
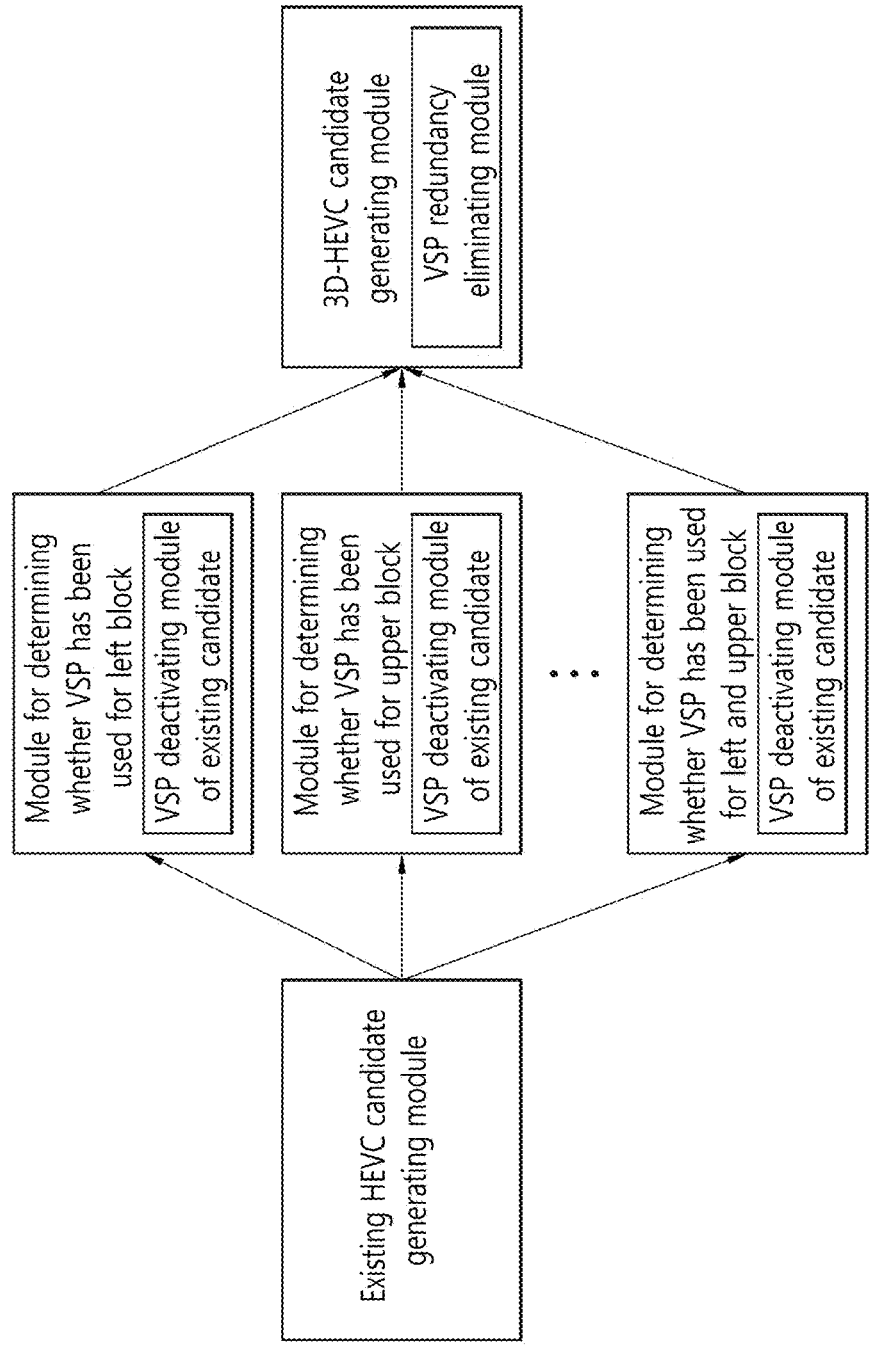
FIG. 28 is a block diagram illustrating an apparatus for restricting insertion of a VSP candidate into a merge list according to another embodiment of the present invention.

FIG. 28 is a block diagram illustrating an apparatus for restricting insertion of a VSP candidate into a merge list according to another embodiment of the present invention.

Referring to FIG. 28, the apparatus for restricting insertion of the VSP candidate into the merge list may include a 3D HEVC candidate generating module such as an existing HEVC candidate generating module or a module for determining whether to use the VSPO for a left block.

The existing HEVC candidate generating module may mean the above-described existing motion candidate generating module. A detailed description of the existing HEVC candidate generating module has been given above.

The module for determining whether to use the VSP for the left block (e.g., a module for determining whether to use the VSP for an upper block, left and lower block, left and upper block or right and upper block) may include a VSP deactivating module of the existing candidate. The module for determining whether to use the VSP for the left block may deactivate use of the VSP by other spatial neighboring channels depending on whether each spatial neighboring channel uses the VSP. Accordingly, for spatial neighboring channels, only predetermined candidates of a predetermined direction are used as VSP candidates, and the number of times of accessing the VSP flag stored per block is reduced. Thus, in 3D image encoding/decoding, memory access may be reduced.

The 3D HEVC candidate generating module may mean the above-described 3D motion candidate generating module. The 3D HEVC candidate generating module may include a VSP redundancy eliminating module.

The above-described 3D image encoding/decoding apparatus and method may be used in 3D-HEVC (High Efficiency Video Coding) that is underway for standardization jointly by the MPEG (Moving Picture Experts Group) and the VCEG (Video Coding Experts Group). Accordingly, the above-described apparatus and method may have different applicable ranges depending on the block size or the depth of CU (Coding Unit) or TU (Transform Unit) as shown in Table 1. As the variable (i.e., size or depth information) for determining an applicable range, a value predetermined in the coder/decoder or a value determined according to a profile or level may be used. Or, if a variable value is stated in a bit stream in the coding apparatus and method, the variable value may be obtained from the bit stream in the coding apparatus and method. In case different applicable ranges apply depending on CU depths, as exemplified in Table 1, there may be A) a scheme in which it applies only to a given depth or more, B) a scheme in which it applies only to the given depth or less, or C) a scheme in which it applies to the given depth only.

In case the present methods do not apply to all the depths, a flag may indicate that the above-described method does not apply or may be represented as a CU depth value indicating an applicable range is signaled with a value that is the maximum value of the CP depth plus one.

TABLE 1

| Depth of CU (or PU or TU) | A | B | C |
|---|---|---|---|
| 0 | X | O | X |
| 1 | X | O | X |
| 2 | O | O | O |
| 3 | O | X | X |
| 4 or more | O | X | X |

Figure 29:
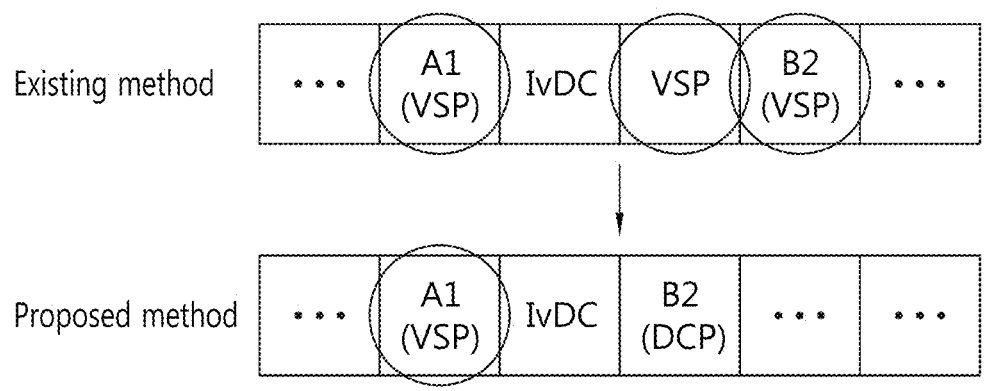
FIG. 29 illustrates an example in which inter-VSP candidate redundancy has been removed through the above-described 3D image encoding/decoding apparatus and method.

FIG. 29 illustrates an example in which inter-VSP candidate redundancy has been removed through the above-described 3D image encoding/decoding apparatus and method.

Referring to FIG. 29, it could be identified that if the existing method applies, the VSP candidates are delicately present in the merge candidate list, but if the 3D encoding/decoding apparatus applies as proposed herein, the redundant presence of VSP candidates may be enhanced.

In the above-described embodiments, the methods are described based on the flowcharts with a series of steps or units, but the present invention is not limited to the order of the steps, and rather, some steps may be performed simultaneously or in different order with other steps. It should be appreciated by one of ordinary skill in the art that the steps in the flowcharts do not exclude each other and that other steps may be added to the flowcharts or some of the steps may be deleted from the flowcharts without influencing the scope of the present invention.

Further, the above-described embodiments include various aspects of examples. Although all possible combinations to represent various aspects cannot be described, it may be appreciated by those skilled in the art that any other combination may be possible. Accordingly, the present invention includes all other changes, modifications, and variations belonging to the following claims.

The above-described methods according to the present invention may be prepared in a computer executable program that may be stored in a computer readable recording medium, examples of which include a ROM, a RAM, a CD-ROM, a magnetic tape, a floppy disc, or an optical data storage device, or may be implemented in the form of a carrier wave (for example, transmission through the Internet).

The computer readable recording medium may be distributed in computer systems connected over a network, and computer readable codes may be stored and executed in a distributive way. The functional programs, codes, or code segments for implementing the above-described methods may be easily inferred by programmers in the art to which the present invention pertains.

Although the present invention has been shown and described in connection with preferred embodiments thereof, the present invention is not limited thereto, and various changes may be made thereto without departing from the scope of the present invention defined in the following claims, and such changes should not be individually construed from the technical spirit or scope of the present invention.

What is claimed is:

1. A method for 3D image decoding a 3D image, the method comprising:
    deriving a merge candidate list by inserting a first candidate block in to the merge candidate list;
    determining whether a view synthesis prediction (VSP) has been used in the first candidate block;
    in response to the first candidate block having been determined to have used VSP, generating information indicating that the VSP has been used in the first candidate block;
    constructing the merge candidate list by inserting one or more other candidate blocks and by abstaining from inserting a VSP candidate of a current block into the merge candidate list when the information indicating that the VSP has been used in the first candidate block is present; and
    performing an inter prediction for the current block based on the merge candidate list to decode the 3D image.

2. The method for claim 1, wherein the first candidate block is a spatial neighboring block of the current block.

3. The method for claim 2, wherein the first candidate block is the spatial neighboring block positioned at a left side of the current block.

4. The method for claim 1, wherein the first candidate block is an A1 block.

5. The method for claim 1, wherein the information indicating that the VSP has been used includes at least one of information indicating whether the first candidate block is available and information indicating whether the VSP has been used in the first candidate block.

6. The method for claim 1, wherein the deriving of the merge candidate list comprises inserting a second candidate block into the merge candidate list after inserting the first candidate block into the merge candidate list,
    wherein the generating of the information indicating that the VSP has been used in the first candidate block includes generating the information indicating that the VSP has been used in the first candidate block when the VSP has been used in the first candidate block or the second candidate block.

7. The method for claim 6, wherein the first candidate block is a spatial neighboring block positioned at a left side of the current block, and the second candidate block is a spatial neighboring block positioned at an upper side of the current block.

8. The method for claim 6, wherein the first candidate block is an A1 block, and the second candidate block is a B1 block.

9. The method for claim 1, wherein the current block is a sub prediction block.

10. An apparatus for 3D image decoding a 3D image, the apparatus comprising:
    at least one processor, and
    a memory storing at least one instruction executed by the at least one processor, wherein the at least one instruction is configured to cause the at least one processor to:
    derive a merge candidate list by inserting a first candidate block into the merge candidate list;
    determine whether a view synthesis prediction (VSP) has been used in the first candidate block;
    in response to the first candidate having been determined to have used VSP, generate information indicating that the VSP has been used in the first candidate block;
    construct the merge candidate list by inserting other candidate blocks and by abstaining from inserting a VSP candidate of a current block into the merge candidate list when the information indicating that the VSP has been used in the first candidate block is present; and
    perform an inter prediction for the current block based on the merge candidate list to decode the 3D image.

11. The apparatus for claim 10, wherein the first candidate block is a spatial neighboring block of the current block.

12. The apparatus for claim 11, wherein the first candidate block is the spatial neighboring block positioned at a left side of the current block.

13. The apparatus for claim 10, wherein the first candidate block is an A1 block.

14. The apparatus for claim 10, wherein the information indicating that the VSP has been used includes at least one of information indicating whether the first candidate block is available and information indicating whether the VSP has been used in the first candidate block.

15. The apparatus for claim 10, wherein the at least one instruction is further configured to cause the at least one processor to insert a second candidate block into the merge candidate list after inserting the first candidate block into the merge candidate list, and
    wherein the at least one instruction is further configured to cause the at least one processor to generate the information indicating that the VSP has been used in the first candidate block when the VSP has been used in the first candidate block or the second candidate block.

16. The apparatus for claim 15, wherein the first candidate block is a spatial neighboring block positioned at a left side of the current block, and the second candidate block is a spatial neighboring block positioned at an upper side of the current block.

17. The apparatus for claim 15, wherein the first candidate block is an A1 block, and the second candidate block is a B1 block.

18. The apparatus for claim 10, wherein the current block is a sub prediction block.

19. A method for 3D image encoding a 3D image, the method comprising:
   deriving a merge candidate list by inserting a first candidate block into the merge candidate list;
   in response to the first candidate block having used view synthesis prediction (VSP), generating information indicating that the VSP has been used in the first candidate block;
   constructing the merge candidate list by inserting one or more other blocks and by abstaining from inserting a VSP candidate of a current block into the merge candidate list when the information indicating that the VSP has been used in the first candidate block is present; and
   performing an inter prediction for the current block based on the merge candidate list to encode the 3D image.

20. An apparatus for 3D image encoding a 3D image, the apparatus comprising:
   at least one processor, and
   a memory storing at least one instruction executed by the at least one processor, wherein the at least one instruction is configured to cause the at least one processor to:
   derive a merge candidate list by inserting a first candidate block into the merge candidate list;
   determine whether a view synthesis prediction (VSP) has been used in the first candidate block;
   in response to the first candidate block having been determined to have used VSP, generate information indicating that view synthesis prediction (VSP) has been used in the first candidate block;
   construct the merge candidate list by inserting one or more other candidate blocks and by abstaining from inserting a VSP candidate of a current block into the merge candidate list when the information indicating that the VSP has been used in the first candidate block is present; and
   perform an inter prediction for the current block based on the merge candidate list to encode the 3D image.

* * * * *